(12) United States Patent
Shin et al.

(10) Patent No.: US 10,902,771 B2
(45) Date of Patent: Jan. 26, 2021

(54) MICRO LED DISPLAY DEVICE AND METHOD OF FABRICATING THE SAME

(71) Applicant: LUMENS CO., LTD., Yongin-si (KR)

(72) Inventors: Eun Sung Shin, Yongin-si (KR); Dong Hee Cho, Yongin-si (KR); Yong Pil Kim, Yongin-si (KR); Myung Ji Moon, Yongin-si (KR); Han Beet Chang, Yongin-si (KR); Jae Soon Park, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 16/822,612

(22) Filed: Mar. 18, 2020

(65) Prior Publication Data

US 2020/0219438 A1    Jul. 9, 2020

Related U.S. Application Data

(63) Continuation of application No. 15/888,943, filed on Feb. 5, 2018, now Pat. No. 10,636,349.

(30) Foreign Application Priority Data

Apr. 21, 2017  (KR) .......................... 10-2017-0051892

(51) Int. Cl.
G09G 3/32 (2016.01)
H04N 5/374 (2011.01)
G09G 3/14 (2006.01)

(52) U.S. Cl.
CPC ................. G09G 3/32 (2013.01); G09G 3/14 (2013.01); H04N 5/374 (2013.01); *G09G 2310/0264* (2013.01)

(58) Field of Classification Search
None
See application file for complete search history.

(56) References Cited

U.S. PATENT DOCUMENTS

2012/0223875 A1* 9/2012 Lau ....................... H01L 27/156
345/83

* cited by examiner

*Primary Examiner* — Stephen T. Reed
(74) *Attorney, Agent, or Firm* — Mei & Mark LLP

(57) ABSTRACT

Disclosed is a micro light emitting diode (LED) display device which is capable of implementing a full color of high resolution, the micro LED display device including: a micro LED driving substrate (backplane) in which a plurality of CMOS cells is arranged in rows and columns; and a micro LED panel which is flip-chip bonded onto the micro LED driving substrate, and includes a plurality of micro LED pixels electrically connected with the plurality of CMOS cells, in which the micro LED panel includes the plurality of micro LED pixels formed by etching a first surface of an emission structure along a unit pixel region, and a plurality of separators formed on a second surface of the emission structure corresponding to positions of portions formed by etching the emission structure in a vertical direction.

18 Claims, 18 Drawing Sheets

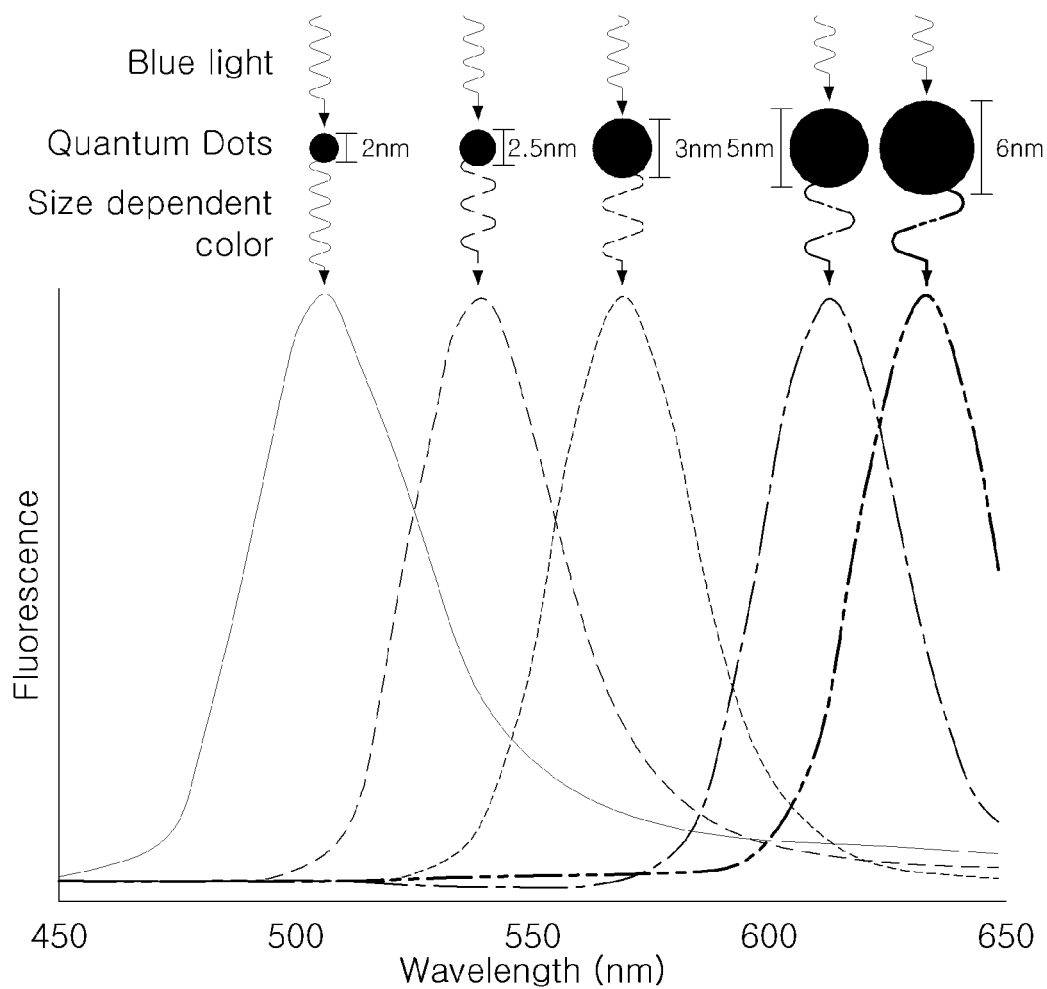

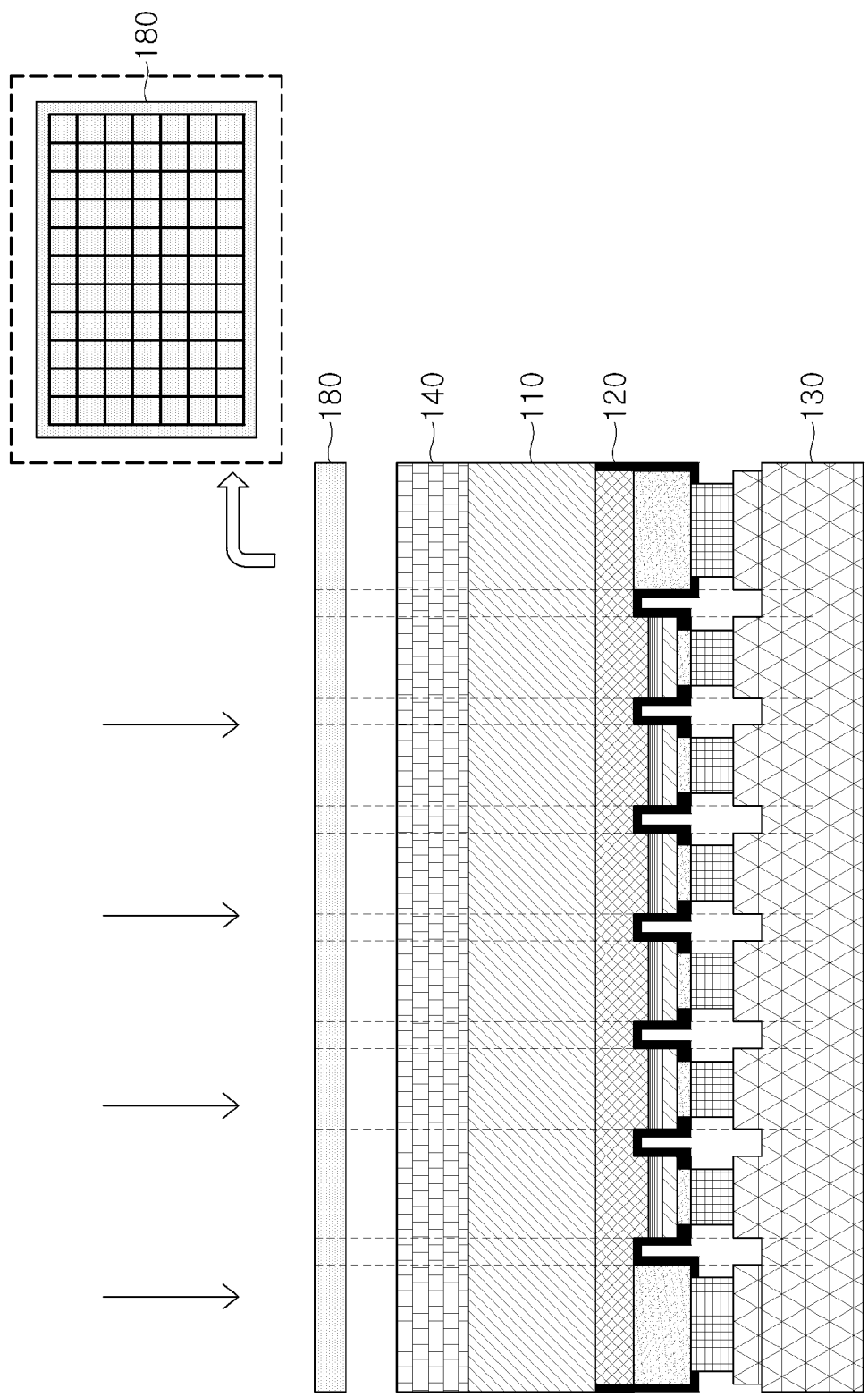

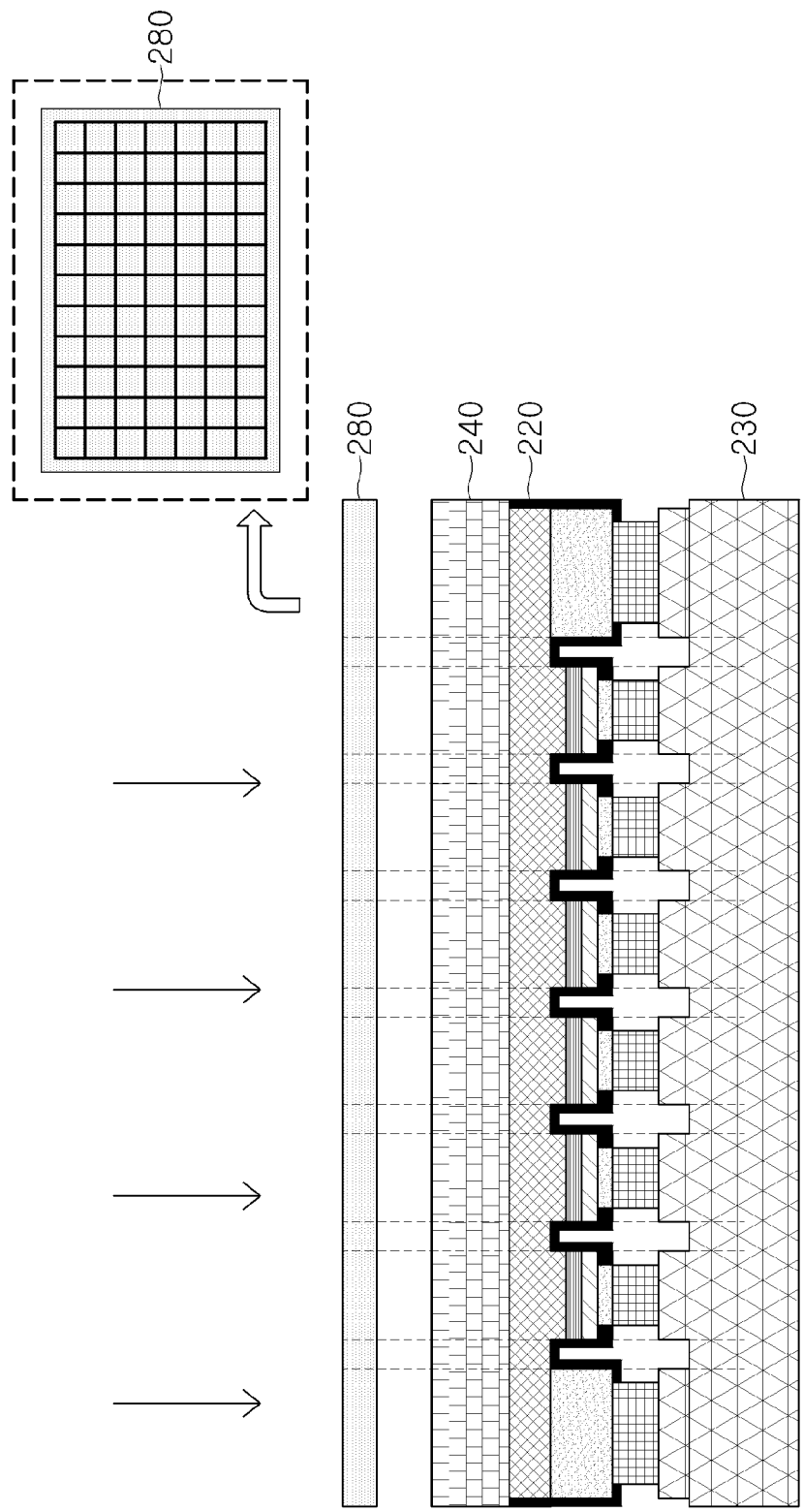

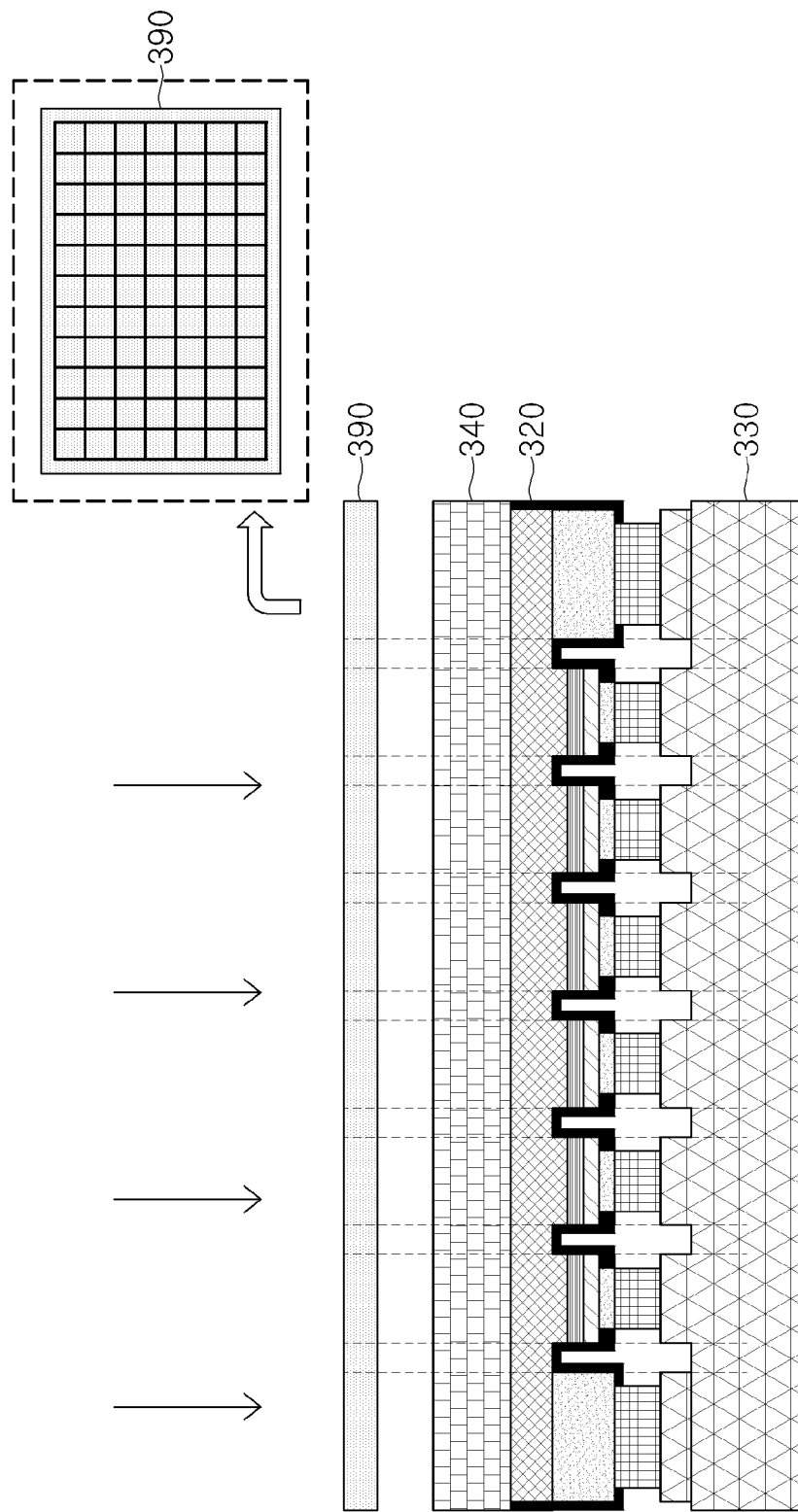

MICRO LED DISPLAY DEVICE AND METHOD OF FABRICATING THE SAME

CROSS-REFERENCE TO RELATED APPLICATIONS

This application is a continuation of U.S. application Ser. No. 15/888,943, filed on Feb. 5, 2018, which claims the priority to and the benefit of Korean Patent Application No. 10-2017-0051892, filed in the Korean Intellectual Property Office on Apr. 21, 2017, the entire contents of which are incorporated herein by reference.

BACKGROUND OF THE DISCLOSURE

1. Field of the Disclosure

The present invention relates to a micro light emitting diode (LED) display device and a method of fabricating the same, and more particularly, to a micro LED display device which has a separator structure between micro LED pixels, and a method of fabricating the same.

2. Background of the Disclosure

A light emitting diode (LED) is a sort of semiconductor device which converts electric energy to light energy. The LED has advantages in low power consumption, semi-permanent life, high response speed, safety, and eco friendliness, compared to an existing light source, such as fluorescent light and incandescent light.

In this respect, a lot of research on replacement of the existing light source with the LED has been conducted, and there increases the case in which the LED is used as a light source of a lighting device, such as various lamps used in indoor and outdoor places, a liquid crystal display device, an electronic display, and a streetlamp.

Recently, an LED industry makes a new attempt to be applied to various industries beyond an existing traditional lighting range, and particularly, research is actively conducted in a low power driven flexible display field, an attachment-type information display device field for monitoring a human body, a vital reaction and deoxyribonucleic acid (DNA) sensing field, a bio convergence field for verifying effectiveness of optogenetics, and a photonics textile field in which a conductive fiber is combined with an LED light source.

In general, when an LED chip is fabricated in a size of several to several tens of micros which is small, it is possible to overcome a disadvantage in that the LED chip is broken when an inorganic material is bent according to a characteristic of the inorganic material, and it is possible to broadly apply the LED chip to various application fields up to a wearable device and a medical device for body insertion, as well as the foregoing flexible display, by giving flexibility by transferring the LED chip to a flexible substrate. However, when the LED light source is applied to the foregoing application fields, it is necessary to develop a light source which is thin and flexible, and has a size in a micro level, and in order to give flexibility to the LED, there is a demand for a process of transferring a separated thin film GaN layer to a flexible substrate in an individual or desired arrangement.

According to the research and development on the micro LED technology field, there currently exists a micro LED panel fabricating technology which is capable of implementing one color (that is, red, green, and blue), but a micro LED panel fabricating technology which is capable of implementing a full color has not been reported in the academic world or the industrial world as yet. Accordingly, it is necessary to develop a micro LED panel which is capable of implementing a full color.

SUMMARY OF THE DISCLOSURE

An object of the present invention is to solve the foregoing problems and other problems. Another object of the present invention is to provide a micro light emitting diode (LED) display device having a structure in which a plurality of separators is repeatedly formed on a growth substrate corresponding to locations between micro LED pixels, and a method of fabricating the same.

Another object of the present invention is to provide a micro light emitting diode (LED) display device having a structure in which a plurality of separators is repeatedly formed on a first conductive semiconductor layer corresponding to locations between micro LED pixels, and a method of fabricating the same.

Another object of the present invention is to provide a micro light emitting diode (LED) display device which is capable of implementing a full color by injecting an R/G/B color light changing material between separators, and a method of fabricating the same.

Another object of the present invention is to provide a micro light emitting diode (LED) display device which is capable of implementing a full color by injecting a fluorescent substance for emitting a white color between separators and disposing a color filter on the fluorescent substance, and a method of fabricating the same.

An exemplary embodiment of the present invention provides a micro light emitting diode (LED) display device, including: a micro LED driving substrate (backplane) in which a plurality of CMOS cells is arranged in rows and columns; and a micro LED panel which is flip-chip bonded onto the micro LED driving substrate, and includes a plurality of micro LED pixels electrically connected with the plurality of CMOS cells, in which the micro LED panel includes the plurality of micro LED pixels formed by etching a first surface of an emission structure along a unit pixel region, and a plurality of separators formed on a second surface of the emission structure corresponding to positions of (dent) portions formed by etching the emission structure in a vertical direction.

Another exemplary embodiment of the present invention provides a method of fabricating a micro light emitting diode (LED) display device, the method including: fabricating a micro LED driving substrate (backplane) in which a plurality of CMOS cells is arranged in rows and columns; fabricating a micro LED panel including a plurality of micro LED pixels formed by etching a first surface of an emission structure along a unit pixel region, and corresponding to the plurality of CMOS cells; disposing a plurality of bumps on the micro LED driving substrate, and flip-chip bonding the micro LED panel on the micro LED driving substrate on which the plurality of bumps is disposed; coating a second surface of the emission structure with a photo resist, disposing mask patterns on the photo resist, and performing an exposure process of emitting light; and forming a plurality of separators on the second surface of the emission structure by performing a developing process on the photo resist which passes through the exposure process.

The effects of the micro LED display device and the method of fabricating the same according to the exemplary embodiments of the present invention will be described below.

According to at least one of the exemplary embodiments of the present invention, the plurality of separators is periodically disposed on the growth substrate corresponding to the locations between the pixels, thereby effectively removing color interference between the pixels and easily applying the R/G/B color light changing materials onto the growth substrate.

According to at least one of the exemplary embodiments of the present invention, the plurality of separators is periodically disposed on the emission structure corresponding to the locations between the pixels, thereby effectively removing color interference between the pixels, minimizing light scattering due to the growth substrate, and easily applying the R/G/B color light changing materials onto the emission structure.

According to at least one of the exemplary embodiments of the present invention, the plurality of separators is periodically disposed on the emission structure corresponding to locations between the pixels, thereby effectively removing color interference between the pixels, minimizing light scattering due to the growth substrate, and easily applying the white light emitting fluorescent substance onto the emission structure.

However, the effects achieved by the micro LED display device and the method of fabricating the same according to the exemplary embodiments of the present invention are not limited to the foregoing matters, and non-mentioned other effects may be clearly appreciated to those skilled in the art on the basis of the descriptions below.

BRIEF DESCRIPTION OF THE DRAWINGS

FIG. 4 is a diagram referred for describing a relationship between a size of a quantum dot and a luminous color.

FIGS. 5A to 5G are diagrams illustrating a method of fabricating the micro LED display device according to the first exemplary embodiment of the present invention.

FIGS. 7A to 7H are diagrams illustrating a method of fabricating the micro LED display device according to the second exemplary embodiment of the present invention.

FIGS. 10A to 10H are diagrams illustrating a method of fabricating the micro LED display device according to the third exemplary embodiment of the present invention.

DETAILED DESCRIPTION OF THE PREFERRED EMBODIMENTS

Figure 1:
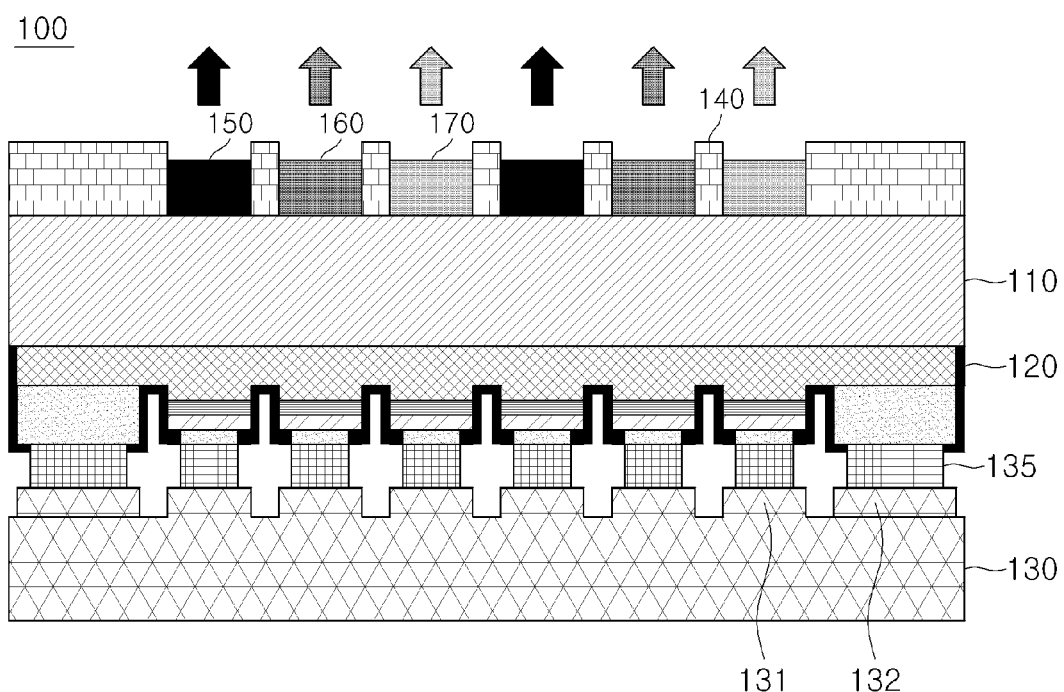
FIG. 1 is a cross-sectional view illustrating a micro LED display device according to a first exemplary embodiment of the present invention.

Hereinafter, exemplary embodiments disclosed in the present specification will be described in detail with reference to the accompanying drawings, and the same or similar constituent elements are denoted by the same reference numerals regardless of a sign of the drawing, and repeated description thereof will be omitted. Hereinafter, in the description of the exemplary embodiments of the present invention, a case where each layer (film), a region, a pattern, or structures are formed "on" or "under" a substrate, each layer (film), a region, a pad, or patterns includes all of the cases in which each layer (film), the region, the pattern, or the structures are directly formed "on" or "under" the substrate, each layer (film), the region, the pad, or the patterns, or intervening constituent elements are present. Further, a reference of "on" or "under" each layer is described with reference to the drawings. In the drawings, for convenience and clearness of description, a thickness or a size of each layer is exaggerated, omitted, or schematically illustrated. Further, a size of each constituent element does not totally reflect an actual size.

In describing the exemplary embodiments disclosed in the present specification, a detailed explanation of known related technology may be omitted so as to avoid unnecessarily obscuring the subject matter of the exemplary embodiments disclosed in the present specification. Further, the accompanying drawings are provided for helping easy understanding of the exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

The present invention proposes a micro light emitting diode (LED) display device which includes a separator structure formed on a growth substrate or an emission structure corresponding to locations between pixels to implement a full color, and a method of fabricating the same. Hereinafter, in the present exemplary embodiment, the micro LED display device may be formed by flip-chip bonding a micro LED panel including a plurality of micro LED pixels and a CMOS backplane including a plurality of CMOS cells for independently driving the plurality of micro LED pixels through bumps.

Hereinafter, various exemplary embodiments of the present invention will be described in detail with reference to the drawings.

First Exemplary Embodiment

FIG. 1 is a cross-sectional view illustrating a micro LED display device according to a first exemplary embodiment of the present invention.

Referring to FIG. 1, the micro LED display device 100 according to the first exemplary embodiment of the present invention may include a micro LED driving substrate (or a CMOS backplane) 130, a micro LED panel, and a plurality of bumps 135.

The micro LED panel is an LED panel including an array structure in which a plurality of micro LED pixels stacked on a wafer is arranged in a matrix form, and may serve to output R/G/B light corresponding to image signals of an image display device. In this case, the plurality of micro LED pixels may be formed by any one of a blue LED, a green LED, a red LED, and a UV LED, but is not limited thereto.

Figure 2:
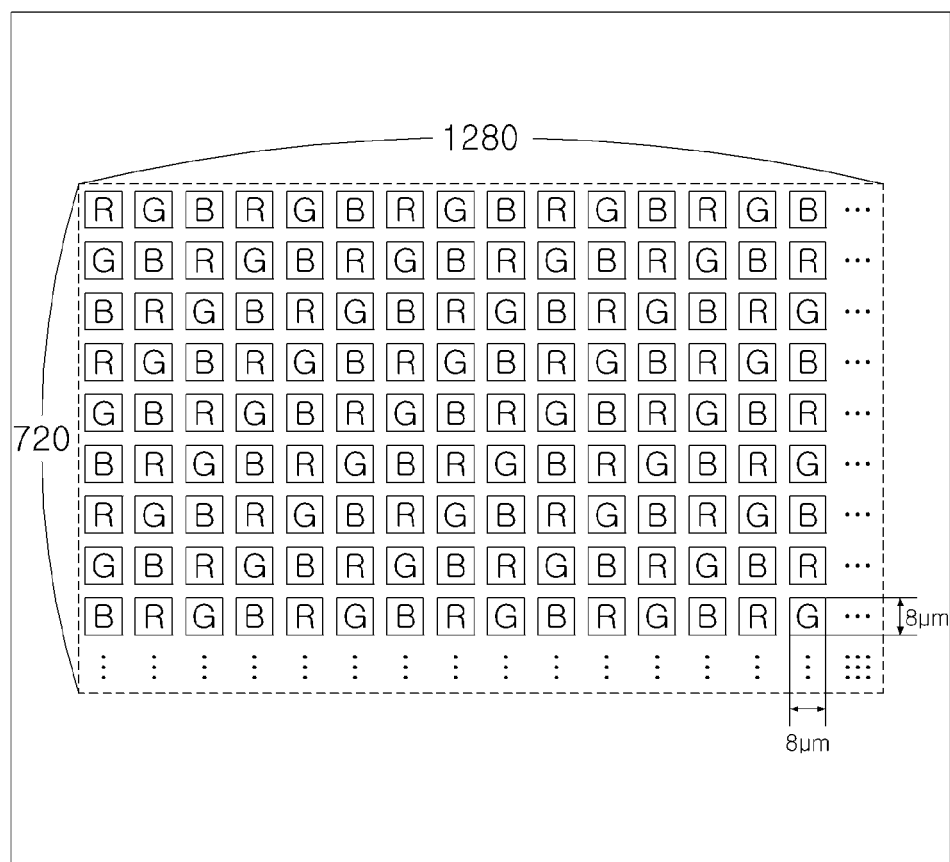
FIG. 2 is a diagram referred for illustrating the number of pixels and a size of a micro LED panel.

For example, as illustrated in FIG. 2, the micro LED panel may include micro LED pixels arranged in a plurality of rows 720 and a plurality of columns 1280. Further, each of the plurality of micro LED pixels configuring the micro LED panel may be formed in a size of 8 μm×8 μm. However, the micro LED display device 100 may be fabricated by changing the number of pixels and a pixel size of the micro LED panel and the like according to a usage and the kind of an image display device, which is apparent to those skilled in the art.

The micro LED panel may include an emission structure (or the plurality of micro LED pixels 120), a growth substrate 110 on the emission structure 120, a plurality of separators 140 on the growth substrate 110, R/G/B color light changing materials 150, 160, and 170 positioned between the separators, and the like.

The emission structure 120 may include a first conductive semiconductor layer, an active layer under the first conductive semiconductor layer, a second conductive semiconductor layer under the active layer, a second conductive metal layer under the second conductive semiconductor layer, and a first conductive metal layer under the first conductive semiconductor layer, and a passivation layer. The emission structure 120 may emit light of different wavelengths according to a composition ratio of a compound semiconductor.

The first conductive semiconductor layer may include a compound semiconductor of III-V group elements in which an n-type dopant is doped. The first conductive semiconductor layer may be selected from semiconductor materials, for example, InAlGaN, GaN, AlGaN, AlInN, InGaN, AlN, and InN, having an empirical formula of $In_xAl_yGa_{1-x-y}N$ ($0 \leq x \leq 1$, $0 \leq y \leq 1$, $0 \leq x+y \leq 1$), and an n-type dopant, such as Si, Ge, and Sn, may be doped.

The active layer is a layer in which electrons (or holes) injected through the first conductive semiconductor layer and holes (or electrons) injected through the second conductive semiconductor layer meet to emit light by a difference in a band gap of an energy band according to a forming material of the active layer. The active layer may be formed in any one of a single quantum well structure, a multi-quantum well (MQW) structure, a quantum dot structure, or a quantum wire structure, but is not limited thereto. The active layer may be formed of a semiconductor material having an empirical formula of $In_xAl_yGa_{1-x-y}N$ ($0 \leq x \leq 1$, $0 \leq y \leq 1$, $0 \leq x+y \leq 1$). When the active layer is formed in the MQW structure, the active layer may be formed by alternately stacking a plurality of well layers and a plurality of barrier layers.

The second conductive semiconductor layer may include a compound semiconductor of III-V group elements in which a p-type dopant is doped. The second conductive semiconductor layer may be selected from semiconductor materials, for example, InAlGaN, GaN, AlGaN, InGaN, AlInN, AlN, InN, having an empirical formula of $In_xAl_yGa_{1-x-y}N$ ($0 \leq x \leq 1$, $0 \leq y \leq 1$, $0 \leq x+y \leq 1$), and a p-type dopant, such as Mg, Zn, Ca, Sr, and Ba, may be doped.

The second conductive metal layer (that is, a p electrode) may be formed on the second conductive semiconductor layer, and the first conductive metal layer (that is, an n electrode) may be formed on the first conductive semiconductor layer. The first and second conductive metal layers provide power to the plurality of micro LED pixels formed in the micro LED panel.

The second conductive metal layer may be disposed on the second conductive semiconductor layer corresponding to each of the micro LED pixels, and may be electrically connected with each CMOS cell 131 provided in a micro LED driving substrate 130 through a bump 135, respectively. In the meantime, as another exemplary embodiment, when a reflective layer (not illustrated), such as a distributed Bragg reflector (DBR) is present on the second conductive semiconductor layer, the second conductive metal layer may be disposed on the reflective layer.

The first conductive metal layer may be formed on a mesa-etched region of the first conductive semiconductor layer, and may be formed while being spaced apart from the plurality of micro LED pixels by a predetermined distance. The first conductive metal layer may be formed on the first conductive semiconductor layer so as to have a predetermined width along an outer region of the micro LED panel. A height of the first conductive metal layer may be formed to be substantially the same as a height of the plurality of micro LED pixels. The first conductive metal layer is electrically connected with a common cell 132 of the micro LED driving substrate 130 by the bump 135 to serve as a common electrode of the micro LED pixels. For example, the first conductive metal layer may be a common ground.

The passivation layer may be formed on at least one lateral surface of the first conductive semiconductor layer, the active layer, the second conductive semiconductor layer, and the first and second conductive metal layers. The passivation layer may be formed to electrically protect the first conductive semiconductor layer, the active layer, and the second conductive semiconductor layer, and may be formed of, for example, $SiO_2$, $SiO_x$, $SiO_xN_y$, $Si_3N_4$, $Al_2O_3$, but is not limited thereto.

The growth substrate 110 may be formed of at least one of materials having transparency, for example, sapphire ($Al_2O_3$), a single crystal substrate, SiC, GaAs, GaN, ZnO, AlN, Si, GaP, InP, and Ge, but is not limited thereto.

The plurality of separators (or partitions or barrier ribs) 140 may be formed on a flat surface, on which the emission structure 120 is not stacked, between two surfaces of the growth substrate 110. The plurality of separators 140 may be disposed on the growth substrate 110 corresponding to locations (that is, regions in which the active layer and the second conductive semiconductor layer are etched) between pixels to minimize color mixing between the pixels. The plurality of separators 140 may be fabricated by a photolithography process. Accordingly, the plurality of separators 140 may be formed of a photo resist (PR). The PR refers to a material which is selectively removing a portion which receives light and a portion which does not receive light during a subsequent development processing process by using a characteristic in which the PR receives light at a specific wavelength, so that solubility of the PR in a developer is changed. As the PR, a polymer compound may be used, but the PR is not limited thereto. In the meantime, as another exemplary embodiment, the plurality of separators 140 may also be formed of a ceramic material, not the polymer compound. In this case, the wet or dry etching process may be added to the photolithography process.

Heights of the separators 140 may be formed to be almost the same, and a gap between the separators 140 may be formed to be the same as a size of the pixel.

The R/G/B color light changing materials (or the R/G/B fluorescent substances) 150, 160, and 170 may be disposed between the separators to change wavelengths of light emitted from the LEDs (that is, the pixels), respectively. The R/G/B color light changing materials 150, 160, and 170 used in the micro LED panel 100 may be changed according to the kind of wavelength emitted by the LED.

As the red emitting fluorescent substance 150, GaAlAs, $(Y, Gd)BO_3:Eu^{3+}$, $Y_2O_2:Eu$, and the like may be used, but the red emitting fluorescent substance 150 is not limited thereto. As the green emitting fluorescent substance 160, GaP:N, $Zn_2SiO_4$:Mn, ZnS:Cu, Al, and the like may be used, but the green emitting fluorescent substance 160 is not limited thereto. As the blue emitting fluorescent substance 170, GaN, BaMgAl$_{14}$O$_{23}$:Eu$^{2+}$, ZnS:Ag, and the like may be used, but the blue emitting fluorescent substance 170 is not limited thereto.

As the R/G/B color light changing materials 150, 160, and 170, a quantum dot may be used. The quantum dot is a semiconductor nano particle of which a diameter has a size of several nanometers (nm), and has a quantum mechanics characteristic, such as a quantum confinement effect. Herein, the quantum confinement effect means a phenomenon in which as a size of a semiconductor nano particle is decreased, a band gap energy is increased (inversely, a wavelength is decreased). The quantum dot fabricated by a chemical synthesis process may implement a desired color only by adjusting a particle size without changing a material thereof. For example, as illustrated in FIG. 4, according to the quantum confinement effect, as a size of a nano particle is small, a quantum dot may emit blue light having a short wavelength, and as a size of a nano particle is large, a quantum dot may emit red light having a long wavelength.

The quantum dot may be a II-VI, III-V, or IV group material, and particularly, may be CdSe, CdTe, CdS, ZnSe, ZnTe, ZnS, InP, GaP, GaInP$_2$, PbS, ZnO, TiO$_2$, AgI, AgBr, Hg$_{12}$, PbSe, In$_2$S$_3$, In$_2$Se$_3$, Cd$_3$P$_2$, Cd$_3$As$_2$, or GaAs. Further, the quantum dot may have a core-shell structure. Herein, the core may include any one material selected from the group consisting of CdSe, CdTe, CdS, ZnSe, ZnTe, ZnS, HgTe, and HgS, and a shell may include any one material selected from the group consisting of CdSe, CdTe, CdS, ZnSe, ZnTe, ZnS, HgTe, and HgS.

The micro LED driving substrate 130 may be disposed so as to face the micro LED panel, and may serve to drive the plurality of micro LED pixels provided in the micro LED panel in response to an input image signal.

The micro LED driving substrate 130 may include an active matrix circuit unit including the plurality of CMOS cells 131 for individually driving the plurality of micro LED pixels, and a common cell 132 disposed in an outer region of the active matrix circuit unit. Examples of the micro LED driving substrate 130 may include a silicon (Si) substrate or a PCB substrate, but the micro LED driving substrate 130 is not limited thereto.

Each of the plurality of CMOs cells 131 provided in the active matrix circuit unit is electrically connected to the corresponding micro LED pixel through the bump 135. Each of the plurality of CMOs cells 131 is an integrated circuit (IC) for individually driving the corresponding micro LED pixel. Accordingly, each of the plurality of CMOS cells 131 may be a pixel driving circuit including two transistors and one capacitor, and when the micro LED panel is flip-chip bonded to the micro LED driving substrate 130 by using the bumps 135, each of the plurality of CMOS cells 131 may be configured in a form in which the individual micro LED pixel is disposed between a drain terminal and a common ground terminal of the transistor of the pixel driving circuit according to the equivalent circuit.

Figure 3:
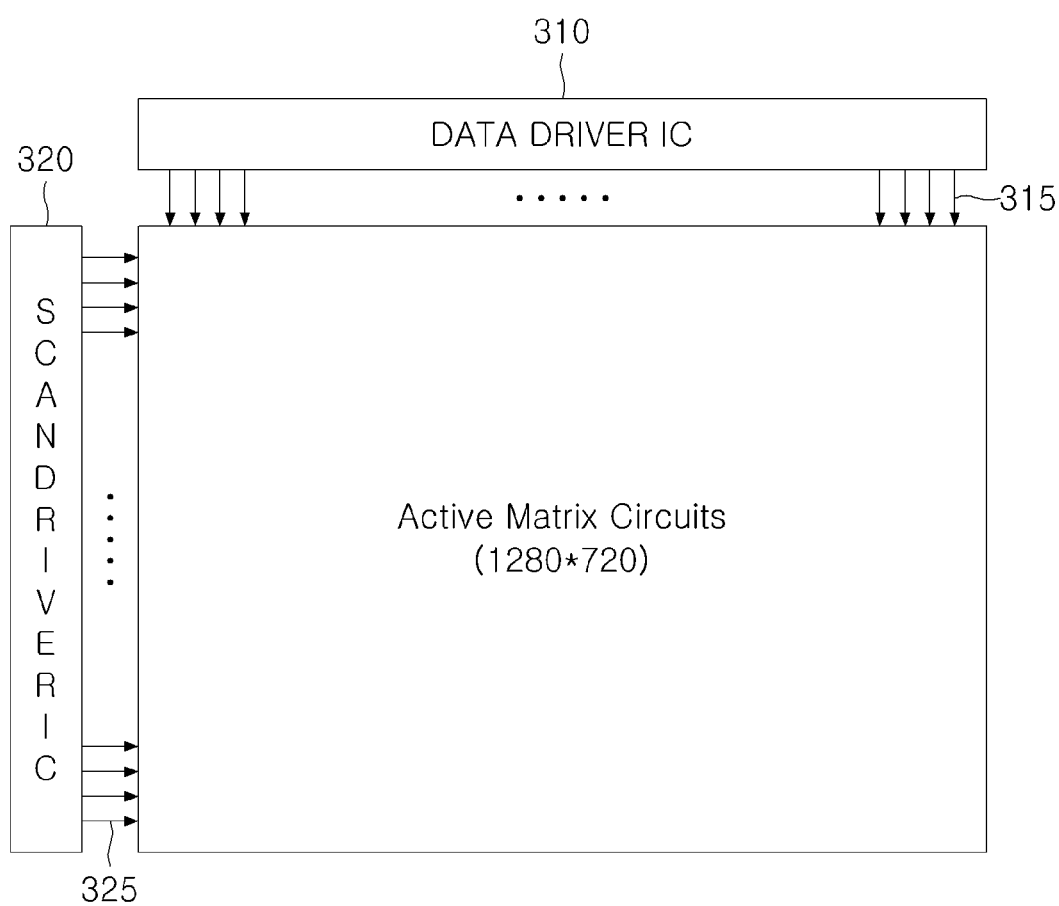
FIG. 3 is a diagram illustrating an operation of driving a micro LED panel through a CMOS backplane.

The common cell 132 disposed in the outer region of the active matrix circuit unit may include a data driver IC and a scan driver IC. For example, as illustrated in FIG. 3, the plurality of micro LED pixels (not illustrated) configuring the micro LED panel may be positioned at crossing points of a plurality of scanning lines 325 and a plurality of data lines 315. The plurality of scanning lines 325 input to the plurality of micro LED pixels are controlled by the scan driver IC 320, and the plurality of data lines 315 input to the plurality of micro LED pixels are controlled by the data driver IC 310.

A control operation of the micro LED panel through the micro LED driving substrate 130 will be simply described. The scan driver IC 320 turns on the pixel by inputting a high (H) signal to any one or more of the plurality of scanning lines 325 while scanning all of the plurality of scanning lines 325 when providing image data. In the meantime, when the data driver IC 310 provides image data to the plurality of data lines 315, the pixels which are in a turn-on state in the scanning lines allow the image data to pass through and the corresponding image data is displayed through the micro LED panel. By this manner, a display for one frame is completed while all of the scanning lines are sequentially scanned.

As described above, in the micro LED display device according to the first exemplary embodiment of the present invention, the plurality of separators is periodically disposed on the growth substrate corresponding to the locations between the pixels, thereby effectively removing color interference between the pixels and easily applying the R/G/B color light changing materials onto the growth substrate.

FIGS. 5A to 5G are diagrams illustrating a method of fabricating the micro LED display device according to the first exemplary embodiment of the present invention.

Figure 5A:
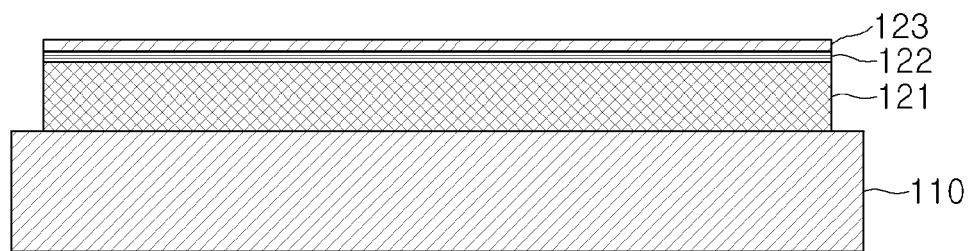

Referring to FIG. 5A, the emission structure 120 may be formed by sequentially growing the first conductive semiconductor layer 121, the active layer 122, and the second conductive semiconductor layer 123 on the growth substrate 110.

The growth substrate 110 may be formed of at least one of materials having transparency, for example, sapphire (Al$_2$O$_3$), a single crystal substrate, SiC, GaAs, GaN, ZnO, AlN, Si, GaP, InP, and Ge, but is not limited thereto.

The first conductive semiconductor layer 121 may be selected from semiconductor materials, for example, InAlGaN, GaN, AlGaN, AlInN, InGaN, AlN, and InN, having an empirical formula of In$_x$Al$_y$Ga$_{1-x-y}$N (0≤x≤1, 0≤y≤1, 0≤x+y≤1), and an n-type dopant, such as Si, Ge, and Sn, may be doped. The first conductive semiconductor layer 121 may be formed by injecting trimethyl gallium (TMGa) gas, ammonia (NH$_3$) gas, and xylene (SiH$_4$) gas to a chamber together with hydrogen gas. An undoped semiconductor layer (not illustrated) and/or a buffer layer (not illustrated) may be further included between the growth substrate 110 and the first conductive semiconductor layer 121, but the present invention is not limited thereto.

The active layer 122 may be formed of a semiconductor material having an empirical formula of In$_x$Al$_y$Ga$_{1-x-y}$N (0≤x≤1, 0≤y≤1, 0≤x+y≤1). The active layer 122 may be formed by injecting trimethyl gallium (TMGa) gas, trimethyl indium (TMIn) gas, and ammonia (NH$_3$) gas to a chamber together with hydrogen gas.

The second conductive semiconductor layer 123 may be selected from semiconductor materials, for example, InAlGaN, GaN, AlGaN, InGaN, AlInN, AlN, InN, having an empirical formula of In$_x$Al$_y$Ga$_{1-x-y}$N (0≤x≤1, 0≤y≤1, 0≤x+y≤1), and a p-type dopant, such as Mg, Zn, Ca, Sr, and Ba, may be doped. The second conductive semiconductor layer 123 may be formed by injecting trimethyl gallium (TMGa) gas, ammonia (NH$_3$) gas, and biacetyl cyclopentadienyl magnesium (EtCp$_2$Mg){Mg(C$_2$H$_5$C$_5$H$_4$)$_2$} gas to a chamber together with hydrogen gas.

Figure 5B:
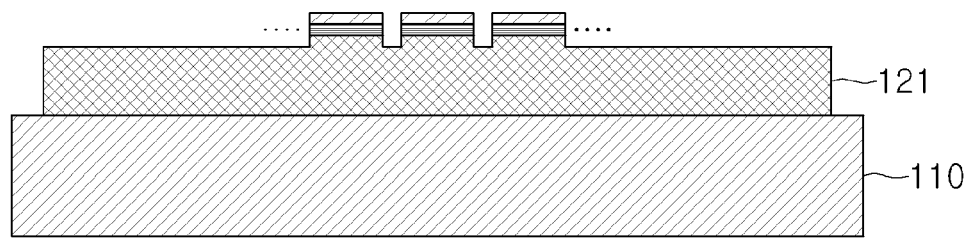

Referring to FIG. 5B, a plurality of LEDs (that is, the plurality of micro LED pixels) may be formed by performing isolation etching on the emission structure 120 according to a unit pixel region. For example, the isolation etching may be performed by a dry etching method, such as inductively coupled plasma (ICP). One upper surface of the first conductive semiconductor layer 121 is exposed through the isolation etching. In this case, in order to form the common electrode (that is, the n electrode) 125, the emission structure 120 may be etched so as that a border region of the first conductive semiconductor layer 121 has a predetermined width.

Figure 5C:
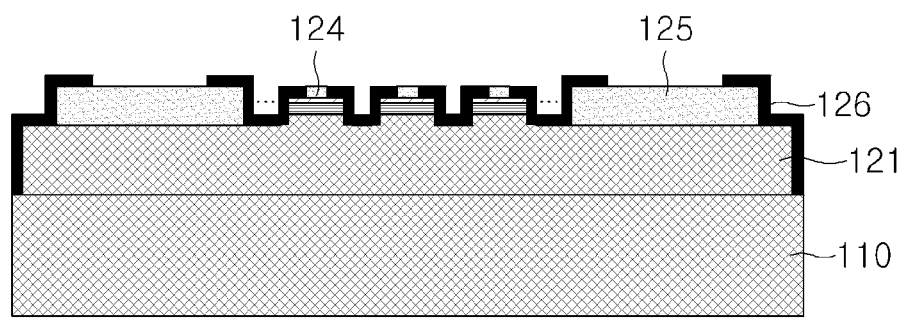

Referring to FIG. 5C, the second conductive metal layer 124 may be formed on one upper surface of the second conductive semiconductor layer 123, and the first conductive metal layer 125 may be formed on one upper surface of the mesa etched first conductive semiconductor layer 121. In this case, the first and second conductive metal layers 125 and 124 may be formed by a deposition process or a plating process, but are not limited thereto.

Then, a passivation layer 126 may be formed on the growth substrate 110, the compound semiconductor layers 121, 122, and 123, the first conductive metal layer 125, and the second conductive metal layer 124, and the passivation layer 126 may be selectively removed so that one upper surface of each of the first and second conductive metal layers 125 and 124 is exposed to the outside.

Figure 5D:
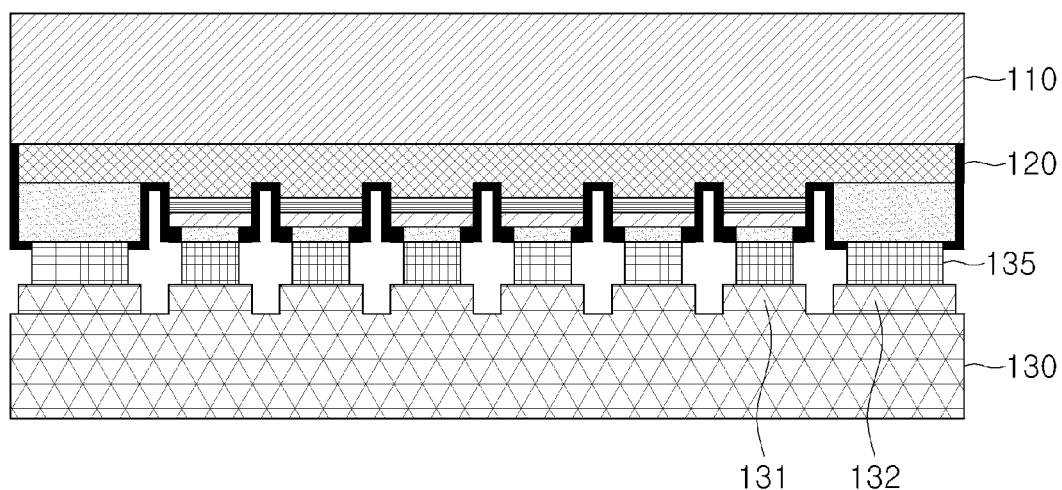

Referring to FIG. 5D, the plurality of bumps 135 is disposed on the CMOS cells 131 and the common cell 132 of the micro LED driving substrate 130. The first and second conductive metal layers 125 and 124 are made to head downwardly by inversing up and down the micro LED panel. The CMOS cells 131 are in contact with the micro LED pixels by making the micro LED driving substrate 130 in the state in which the plurality of bumps 135 is disposed face the micro LED panel and corresponding one-to-one the CMOS cells 131 and the micro LED pixels, and then the CMOS cells 131 and the micro LED pixels are heated. Then, the plurality of bumps 135 is melted, and as a result, the CMOS cells 131 and the corresponding micro LED pixels are electrically connected, and the common cell 132 of the micro LED driving substrate 130 and the common electrode 125 of the micro LED panel corresponding to the common cell 132 are electrically connected.

Referring to FIG. 5E, the PR 140 may be coated on the growth substrate 110 by using a spin coating method. In the meantime, as another exemplary embodiment, bonding force between the growth substrate 110 and the PR 140 may be improved by chemically processing (for example, hexamethyldisilazane processing) the surface of the growth substrate 110 before the coating process.

Then, mask patterns 180 may be precisely arranged on the PR 140, and then an exposure process of emitting ultraviolet rays and the like may be performed. In this case, the mask patterns 180 may be arranged in a matrix form, and an interval between the mask patterns 180 may correspond to a distance between the pixels.

Figure 5F:
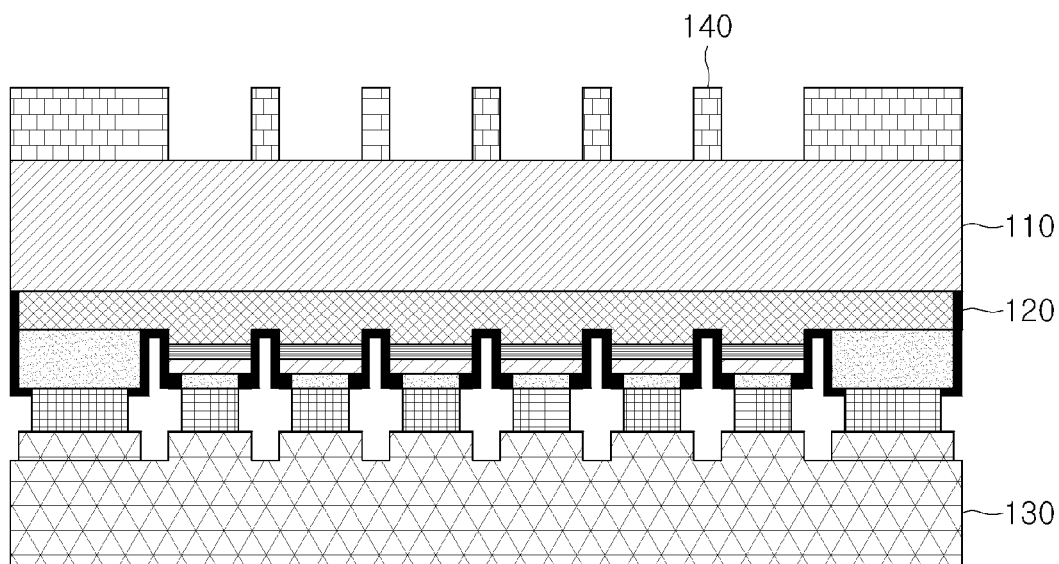

Referring to FIG. 5F, the plurality of separators 140 may be formed on the growth substrate 110 by performing a developing process on the PR 140 which passes the exposure process. In this case, the plurality of separators 140 may be disposed on the growth substrate 110 corresponding to the locations between the pixels (that is, the regions in which the active layer and the second conductive semiconductor layer are etched). In the developing process, as a developer for the PR 140, a water-soluble alkali solution may be used.

In the meantime, in the present exemplary embodiment, the case where the plurality of separators is formed through the PR is exemplified, but the present invention is not limited thereto. For example, as another exemplary embodiment, the plurality of separators may also be formed on the growth substrate by forming a material for forming the separator on the growth substrate, stacking the PR on the material, sequentially performing exposure and developing processes by using a mask pattern, and wet or dry etching a region exposed by the PR.

Figure 5G:
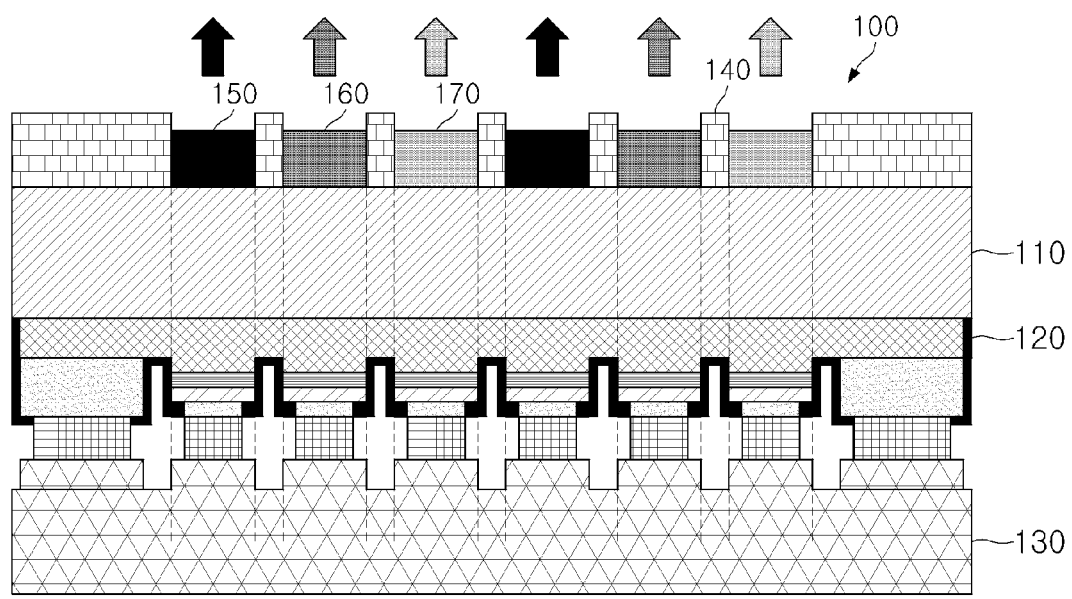

Referring to FIG. 5G, the R fluorescent substance 150 may be injected between a first separator and a second separator formed on the growth substrate 110, the G fluorescent substance 160 may be injected between the second separator and a third separator formed on the growth substrate 110, and the B fluorescent substance 170 may be injected between the third separator and a fourth separator formed on the growth substrate 110. Accordingly, the pixel in which the R fluorescent substance 150 is present between the separators may emit red light, the pixel in which the G fluorescent substance 160 is present between the separators may emit green light, and the pixel in which the B fluorescent substance 170 is present between the separators may emit blue light.

The micro LED display device 100 formed through the foregoing processes may implement a full color of high resolution (an HD level). The micro LED display device 100 may be applied to various display devices, such as a head-up display (HUD) for a vehicle and a head mounted display (HMD).

Second Exemplary Embodiment

Figure 6:
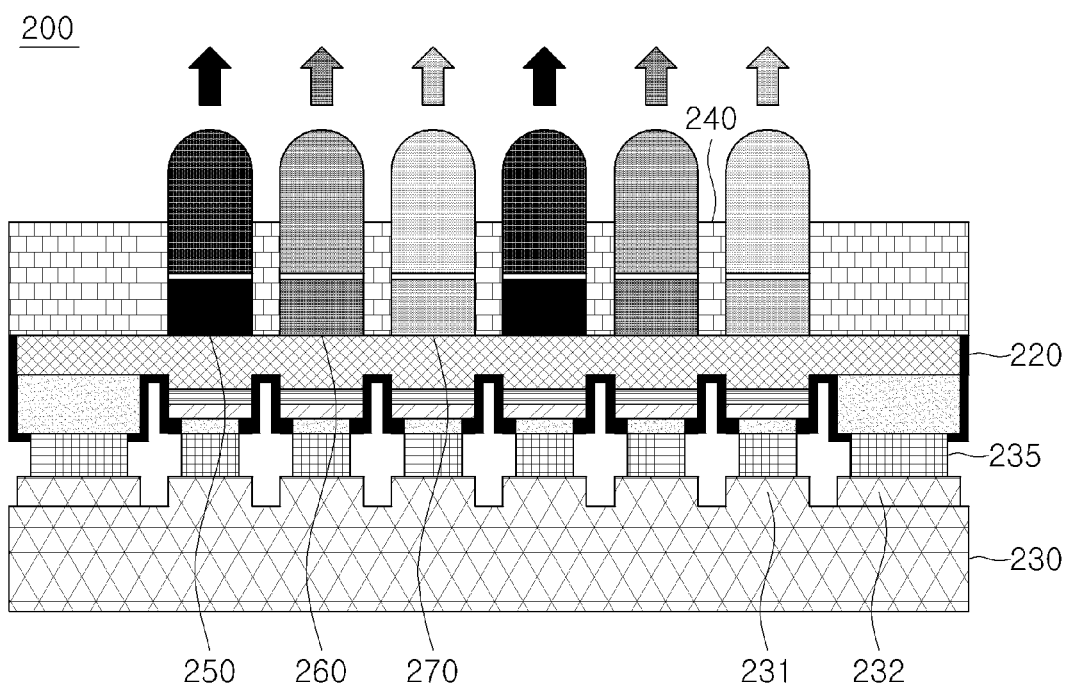
FIG. 6 is a cross-sectional view illustrating a micro LED display device according to a second exemplary embodiment of the present invention.

FIG. 6 is a cross-sectional view illustrating a micro LED display device according to a second exemplary embodiment of the present invention. Unlike the micro LED display device 100 of FIG. 1, the exemplary embodiment of the present invention may provide a micro LED display device which is capable of minimizing light scattering by removing a growth substrate. Herein, in the present exemplary embodiment, a micro LED driving substrate 230, an emission structure 220, a plurality of separators 240, and R/G/B color light changing materials 250, 260, and 270 are the same as the micro LED driving substrate 130, the emission structure 120, the plurality of separators 140, and the R/G/B color light changing materials 150, 160, and 170 of FIG. 1, so that detailed descriptions thereof will be omitted.

Referring to FIG. 6, the micro LED display device 200 according to the second exemplary embodiment of the present invention may include the micro LED driving substrate 230, a micro LED panel, and a plurality of bumps 235.

The micro LED panel is an LED panel including an array structure in which a plurality of micro LED pixels stacked on a wafer is arranged in a matrix form, and may serve to output R/G/B light corresponding to image signals of an image display device. In this case, the plurality of micro LED pixels may be formed by any one of a blue LED, a green LED, a red LED, and a UV LED, but is not limited thereto.

The micro LED panel may include the emission structure (or the plurality of micro LED pixels) 220, the plurality of separators 240 on the emission structure 220, and the R/G/B color light changing materials 250, 260, and 270 positioned between the separators, and the like.

The emission structure 220 may include a first conductive semiconductor layer, an active layer, a second conductive semiconductor layer, a first conductive metal layer, a second conductive metal layer, and a passivation layer. The emission structure 220 may emit light of different wavelengths according to a composition ratio of a compound semiconductor.

The second conductive metal layer (that is, a p electrode) may be formed on the second conductive semiconductor layer of the emission structure 220, and the first conductive metal layer (that is, an n electrode) may be formed on the first conductive semiconductor layer. A passivation layer may be formed on at least one lateral surface of the first conductive semiconductor layer, the active layer, the second conductive semiconductor layer, and the first and second conductive metal layers. The passivation layer may be formed to electrically protect the first conductive semiconductor layer, the active layer, and the second conductive semiconductor layer, and may be formed of, for example, $SiO_2$, $SiO_x$, $SiO_xN_y$, $Si_3N_4$, $Al_2O_3$, but is not limited thereto.

The plurality of separators 240 may be formed on a flat surface which is not etched between two surfaces of the emission structure 220. The plurality of separators 240 may be disposed on the emission structure 220 corresponding to locations (that is, the regions in which the active layer and the second conductive semiconductor layer are etched) between the pixels to serve to minimize color mixing between the pixels. The plurality of separators 240 may be fabricated by a photolithography process.

Heights of the separators 240 may be formed to be almost the same, and a gap between the separators 240 may be formed to be the same as a size of the pixel.

The R/G/B color light changing materials (or the R/G/B fluorescent substances) 250, 260, and 270 may be disposed between the separators to change wavelengths of light emitted from the LEDs (that is, the pixels), respectively. As the red emitting fluorescent substance 250, GaAlAs, (Y, Gd)$BO_3$:$Eu^{3+}$, $Y_2O_2$:Eu, a quantum dot, and the like may be used, but the red emitting fluorescent substance 250 is not limited thereto. As the green emitting fluorescent substance 260, GaP:N, $Zn_2SiO_4$:Mn, ZnS:Cu, Al, a quantum dot, and the like may be used, but the green emitting fluorescent substance 260 is not limited thereto. As the blue emitting fluorescent substance 270, GaN, BaMg$Al_{14}O_{23}$:$Eu^{2+}$, ZnS:Ag, a quantum dot, and the like may be used, but the blue emitting fluorescent substance 270 is not limited thereto.

The micro LED driving substrate 230 may be disposed so as to face the micro LED panel, and may serve to drive the plurality of micro LED pixels provided in the micro LED panel in response to an input image signal. The micro LED driving substrate 230 may include an active matrix circuit unit including a plurality of CMOS cells 231 for individually driving the plurality of micro LED pixels, and a common cell 232 disposed in an outer region of the active matrix circuit unit.

As described above, in the micro LED display device according to the second exemplary embodiment of the present invention, the plurality of separators is periodically disposed on the emission structure corresponding to the locations between the pixels, thereby effectively removing color interference between the pixels, minimizing light scattering due to the growth substrate, and easily applying the R/G/B color light changing materials onto the emission structure.

FIGS. 7A to 7G are diagrams illustrating a method of fabricating the micro LED display device according to the second exemplary embodiment of the present invention.

Figure 7A:
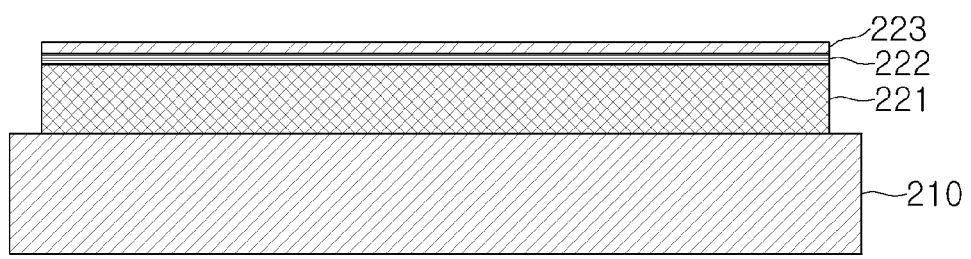

Referring to FIG. 7A, the emission structure 220 may be formed by sequentially growing a first conductive semiconductor layer 221, an active layer 222, and a second conductive semiconductor layer 223 on a growth substrate 210.

The growth substrate 210 may be formed of at least one of the materials having transparency, for example, sapphire ($Al_2O_3$), a single crystal substrate, SiC, GaAs, GaN, ZnO, AlN, Si, GaP, InP, and Ge, but is not limited thereto.

The first conductive semiconductor layer 221 may be selected from semiconductor materials, for example, InAlGaN, GaN, AlGaN, AlInN, InGaN, AlN, and InN, having an empirical formula of $In_xAl_yGa_{1-x-y}N$ ($0 \leq x \leq 1$, $0 \leq y \leq 1$, $0 \leq x+y \leq 1$), and an n-type dopant, such as Si, Ge, and Sn, may be doped. The first conductive semiconductor layer 221 may be formed by injecting trimethyl gallium (TMGa) gas, ammonia ($NH_3$) gas, and xylene ($SiH_4$) gas to a chamber together with hydrogen gas.

The active layer 222 may be formed of a semiconductor material having an empirical formula of $In_xAl_yGa_{1-x-y}N$ ($0 \leq x \leq 1$, $0 \leq y \leq 1$, $0 \leq x+y \leq 1$). The active layer 222 may be formed by injecting trimethyl gallium (TMGa) gas, trimethyl indium (TMIn) gas, and ammonia ($NH_3$) gas to a chamber together with hydrogen gas.

The second conductive semiconductor layer 223 may be selected from semiconductor materials, for example, InAlGaN, GaN, AlGaN, InGaN, AlInN, AlN, InN, having an empirical formula of $In_xAl_yGa_{1-x-y}N$ ($0 \leq x \leq 1$, $0 \leq y \leq 1$, $0 \leq x+y \leq 1$), and a p-type dopant, such as Mg, Zn, Ca, Sr, and Ba, may be doped. The second conductive semiconductor layer 223 may be formed by injecting trimethyl gallium (TMGa) gas, ammonia ($NH_3$) gas, and biacetyl cyclopentadienyl magnesium (EtCp$_2$Mg){Mg($C_2H_5C_5H_4$)$_2$} gas to a chamber together with hydrogen gas.

Figure 7B:
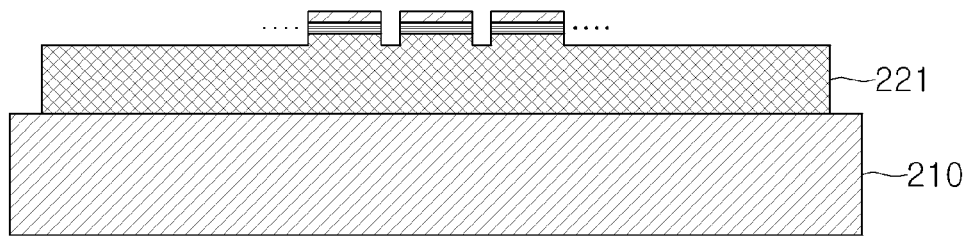
Figure 7C:
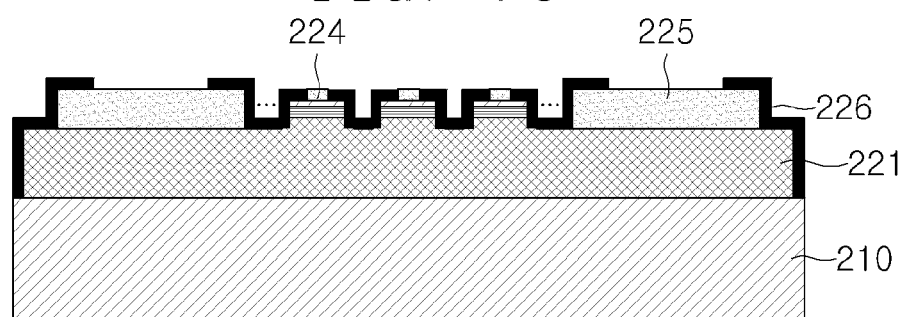

Referring to FIG. 7B, a plurality of LEDs (that is, the plurality of micro LED pixels) may be formed by performing isolation etching on the emission structure 220 according to a unit pixel region. For example, the isolation etching may be performed by a dry etching method, such as inductively coupled plasma (ICP). One upper surface of the first conductive semiconductor layer 221 is exposed through the isolation etching. Referring to FIG. 7C, the second conductive metal layer 224 may be formed on one upper surface of the second conductive semiconductor layer 223, and the first conductive metal layer 225 may be formed on one upper surface of the mesa-etched first conductive semiconductor layer 221. In this case, the first and second conductive metal layers 225 and 224 may be formed by a deposition process or a plating process, but are not limited thereto.

Then, a passivation layer 226 may be formed on the growth substrate 210, the compound semiconductor layers 221, 222, and 223, the first conductive metal layer 225, and the second conductive metal layer 224, and the passivation layer 226 may be selectively removed so that one upper surface of each of the first and second conductive metal layers 225 and 224 is exposed to the outside.

Figure 7D:
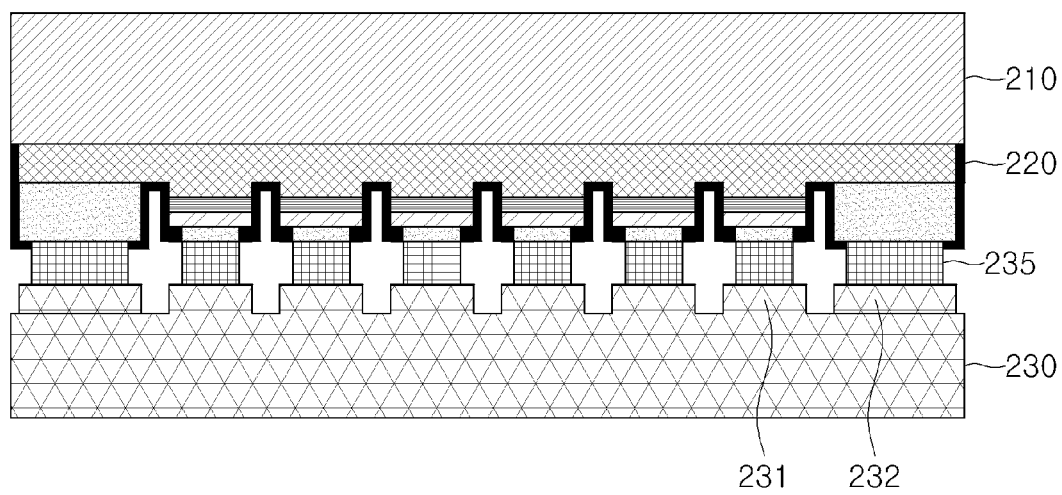

Referring to FIG. 7D, the plurality of bumps 235 is disposed on the CMOS cells 231 and the common cell 232 of the micro LED driving substrate 230. The first and second conductive metal layers 225 and 224 are made to head downwardly by inversing up and down the micro LED panel. The CMOS cells 231 are in contact with the micro LED pixels by making the micro LED driving substrate 230 in the state in which the plurality of bumps 235 is disposed face the micro LED panel and corresponding one-to-one the CMOS cells 231 and the micro LED pixels, and then the CMOS cells 231 and the micro LED pixels are heated. Then, the plurality of bumps 235 is melted, and as a result, the CMOS cells 231 and the corresponding micro LED pixels are electrically connected, and the common cell 232 of the micro LED driving substrate 230 and the common electrode 225 of the micro LED panel corresponding to the common cell 232 are electrically connected.

Figure 7E:
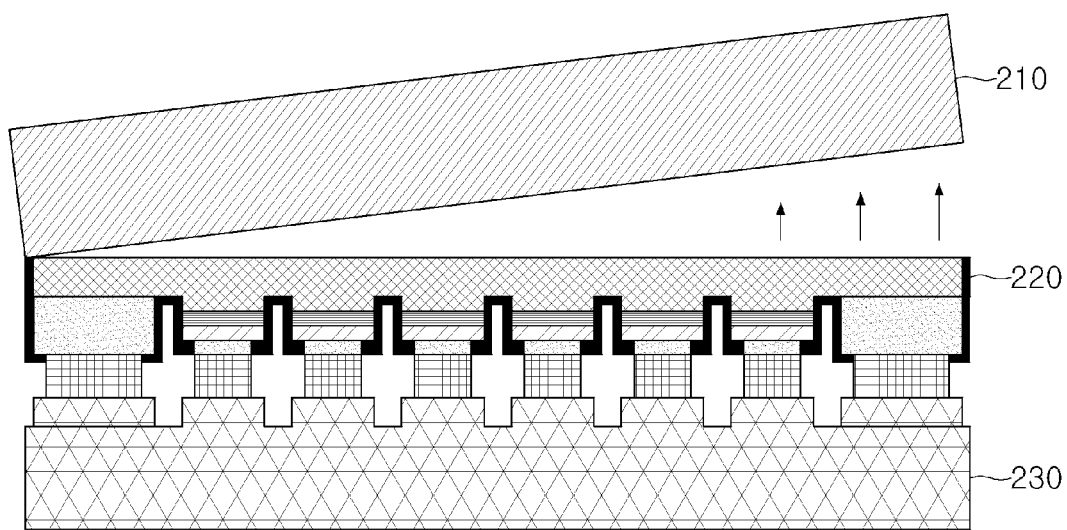

Referring to FIG. 7E, the growth substrate 210 attached to the emission structure 220 may be separated by a laser lift off (LLO) method, a chemical lift off (CLO) method, an electrical lift off (ELO), an etching method, or the like. As another exemplary embodiment, the growth substrate 210 attached to the emission structure 220 may be ground to be flat and at least a part of the growth substrate 210 may be removed.

Referring to FIG. 7F, an upper portion of the emission structure 220 may be coated with a photo resist (PR) 240 by using a spin coating method. In the meantime, as another exemplary embodiment, bonding force between the emission structure 220 and the PR 240 may be improved by chemically processing (for example, hexamethyldisilazane processing) the surface of the emission structure 220 before the coating process. Further, a passivation layer (not illustrated) for protecting the emission structure 220 may be formed between the emission structure 220 and the PR 240 before the coating process. Then, mask patterns 280 may be precisely arranged on the PR 240 and then an exposure process of emitting ultraviolet rays and the like may be performed.

Figure 7G:
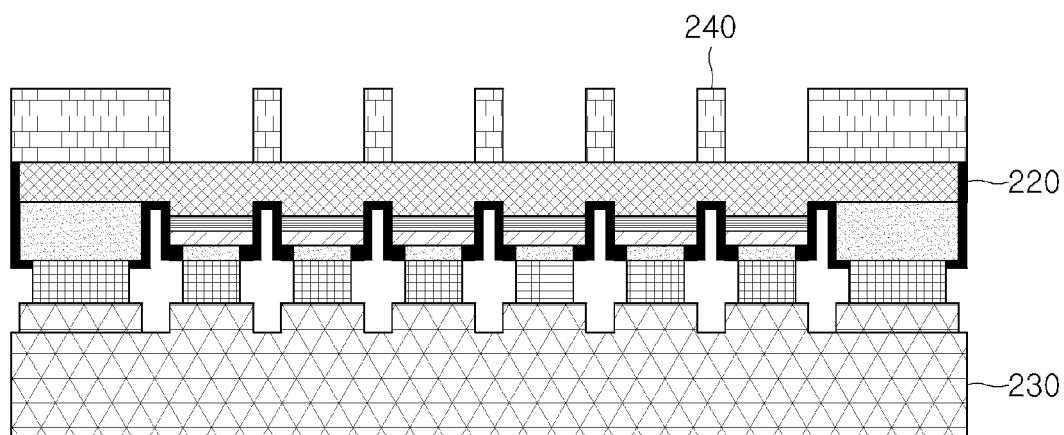

Referring to FIG. 7G, the plurality of separators 240 may be formed on the emission structure 220 by performing a developing process on the PR 240 which passes the exposure process. In this case, the plurality of separators 240 may be disposed on the emission structure 220 corresponding to the locations between the pixels (that is, the regions in which the active layer and the second conductive semiconductor layer are etched).

In the meantime, in the present exemplary embodiment, the case where the plurality of separators is formed through the PR is exemplified, but the present invention is not limited thereto. For example, as another exemplary embodiment, the plurality of separators may also be formed on the growth substrate by forming a material for forming the separator on the growth substrate, stacking the PR on the material, sequentially performing exposure and developing processes by using a mask pattern, and wet or dry etching a region exposed by the PR.

Figure 7H:
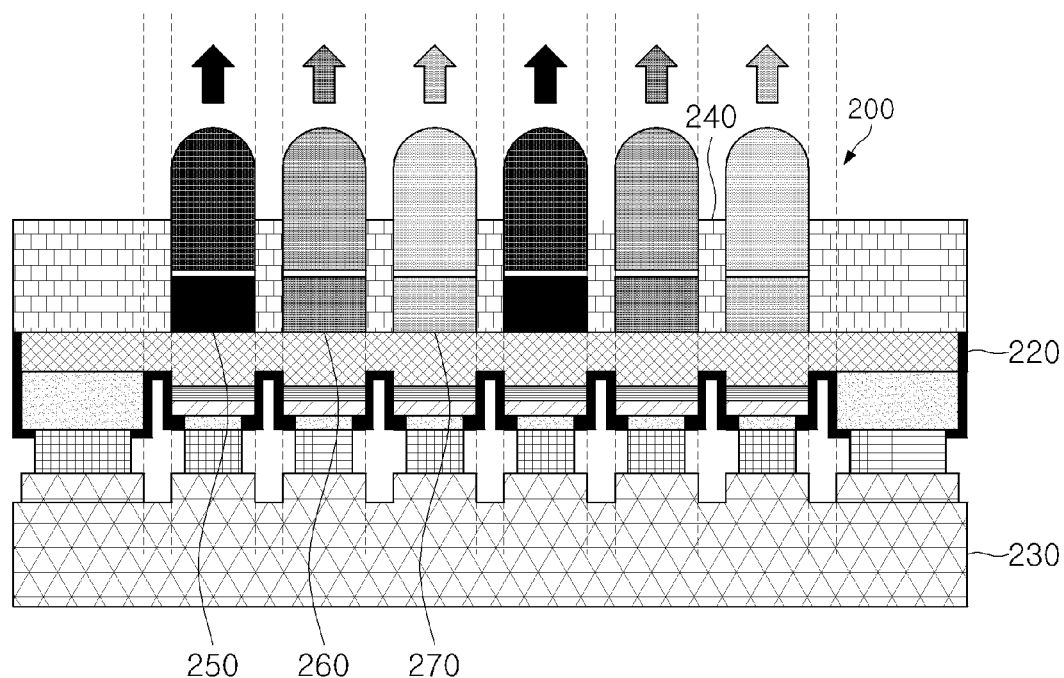

Referring to FIG. 7H, the R fluorescent substance 250 may be injected between a first separator and a second separator formed on the emission structure 220, the G fluorescent substance 260 may be injected between the second separator and a third separator formed on the emission structure 220, and the B fluorescent substance 270 may be injected between the third separator and a fourth separator formed on the emission structure 220. Accordingly, the pixel in which the R fluorescent substance 250 is present between the separators may emit red light, the pixel in which the G fluorescent substance 260 is present between the separators may emit green light, and the pixel in which the B fluorescent substance 270 is present between the separators may emit blue light.

The micro LED display device 200 formed through the foregoing processes may minimize light scattering due to the growth substrate and implement a full color of high resolution (an HD level).

Third Exemplary Embodiment

Figure 8:
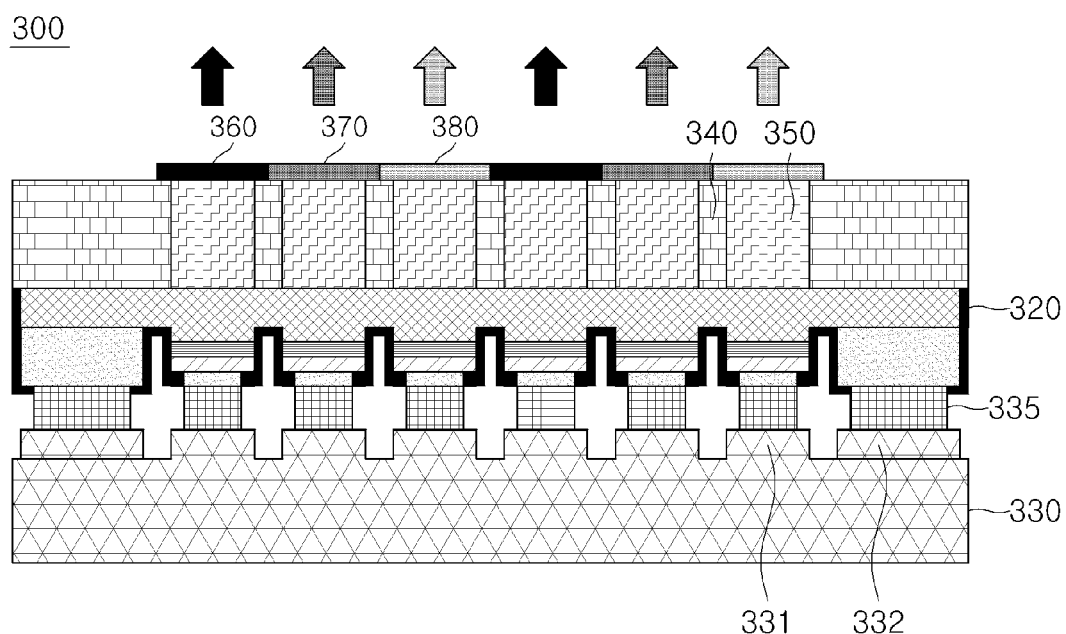
FIG. 8 is a cross-sectional view illustrating a micro LED display device according to a third exemplary embodiment of the present invention.

FIG. 8 is a cross-sectional view illustrating a micro LED display device according to a third exemplary embodiment of the present invention. Unlike the micro LED display device 200 of FIG. 6, the exemplary embodiment of the present invention may provide a micro LED display device which is capable of implementing a full color by disposing fluorescent substances and color filters between separators. Hereinafter, in the present exemplary embodiment, a micro LED driving substrate 330, an emission structure 320, and a plurality of separators 340 are the same as the micro LED driving substrate 230, the emission structure 220, and the plurality of separators 240 of FIG. 6, so that detailed descriptions thereof will be omitted.

Referring to FIG. 8, the micro LED display device 300 according to the third exemplary embodiment of the present invention may include the micro LED driving substrate 330, a micro LED panel, and a plurality of bumps 335.

The micro LED panel is an LED panel including an array structure in which a plurality of micro LED pixels stacked on a wafer is arranged in a matrix form, and may serve to output R/G/B light corresponding to image signals of an image display device. In this case, the plurality of micro LED pixels may be formed by any one of a blue LED, a green LED, a red LED, and a UV LED, but is not limited thereto.

The micro LED panel may include an emission structure (or a plurality of micro LED pixels) 320, the plurality of separators 340 on the emission structure 320, a fluorescent substance 350 positioned between the separators, and color filters 360, 370, and 380 on the fluorescent substance 350.

The plurality of separators 340 may be formed on a flat surface which is not etched between two surfaces of the emission structure 320. The plurality of separators 340 may be disposed on the emission structure 320 corresponding to locations (that is, the regions in which an active layer and a second conductive semiconductor layer are etched) between the pixels to serve to minimize color mixing between the pixels. The plurality of separators 340 may be fabricated by a photolithography process.

Heights of the separators 340 may be formed to be almost the same, and a gap between the separators 340 may be formed to be the same as a size of the pixel.

The fluorescent substance 350 may be disposed between the separators 340 on the emission structure 320 to change a wavelength of light emitted from the plurality of micro LED pixels to a wavelength of white light. For example, when the emission structure 320 is a blue LED, a yellow fluorescent substance (a material based on $Y_3Al_5O_{12}:Ce$ (YAG:Ce)) may be used as the fluorescent substance. Further, when the emission structure 320 is a blue LED, a fluorescent substance obtained by mixing a green fluorescent substance and a red fluorescent substance may be used as the fluorescent substance. Further, when the emission structure 320 is a UV LED, a fluorescent substance obtained by mixing a blue fluorescent substance, a green fluorescent substance, and a red fluorescent substance may be used as the fluorescent substance.

The color filters 360, 370, and 380 may be attached on the fluorescent substance 350 in the unit of a pixel to transmit only light of a specific wavelength in white light emitted from the fluorescent substance 350. That is, the R filter 360 may transmit only a wavelength of red light in white light emitted from the fluorescent substance 350, the G filter 370 may transmit only a wavelength of green light in white light emitted from the fluorescent substance 350, and the B filter 380 may transmit only a wavelength of blue light in white light emitted from the fluorescent substance 350. Accordingly, the pixel in which the fluorescent substance 350 and the R filter 360 are present between the separators may emit red light, the pixel in which the fluorescent substance 350 and the G filter 370 are present between the separators may emit green light, and the pixel in which the fluorescent substance 350 and the B filter 380 are present between the separators may emit blue light.

Figure 9:
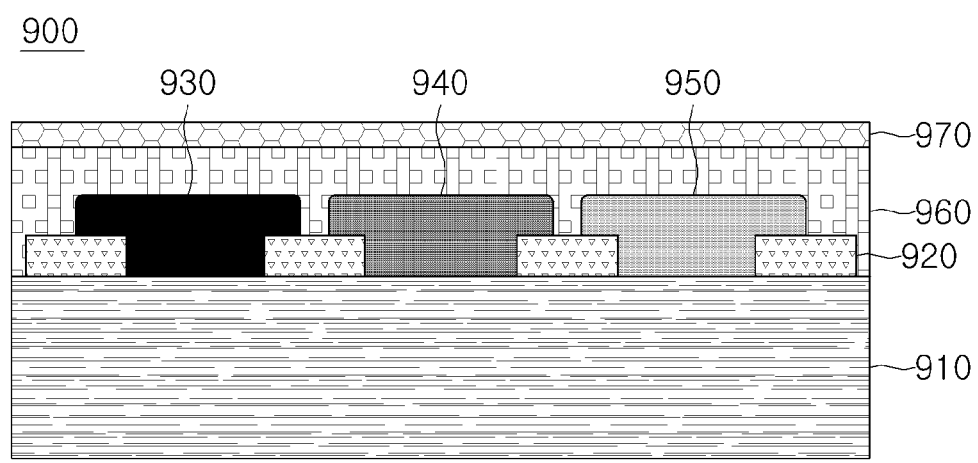
FIG. 9 is a diagram illustrating an example of a structure of a color filter related to the present invention.

As the exemplary embodiment, as illustrated in FIG. 9, a color filter 900 according to the present invention may include a transparent substrate 910, a black matrix 920, color filter layers 930, 940, and 950, an over coat layer 960, and an ITO layer 970.

The transparent substrate 910 may be formed of thin glass or plastic. The black matrix 920 is disposed on the transparent substrate 910 to make light be positioned in an optically inactive region of the transparent substrate 910 to protect light from being leaked. The black matrix 920 needs to have low reflectance for an optimum contrast. The black matrix 920 may be formed of an inorganic material or an organic material, and chrome Cr may be used.

The color filter layers 930, 940, and 950 may be disposed on the transparent substrate 910 and include R/G/B dyes or pigments. The over coat layer 960 protects the color filter layers 930, 940, and 950 from impurities and flattens a surface of the color filter 900. The over coat layer 960 may be formed of a transparent acryl resin, a polyimide resin, a polyurethane resin, or the like. The ITO layer 970 may be formed on the over coat layer 960.

The micro LED driving substrate 330 may be disposed so as to face the micro LED panel, and may serve to drive the plurality of micro LED pixels provided in the micro LED panel in response to an input image signal. The micro LED driving substrate 330 may include an active matrix circuit unit including a plurality of CMOS cells 331 for individually driving the plurality of micro LED pixels, and a common cell 332 disposed in an outer region of the active matrix circuit unit.

As described above, in the micro LED display device according to the third exemplary embodiment of the present invention, the plurality of separators is periodically disposed on the emission structure corresponding to the locations between the pixels, thereby effectively removing color interference between the pixels, minimizing light scattering due to the growth substrate, and easily applying the fluorescent substance for emitting white light onto the emission structure.

FIGS. 10A to 10G are diagrams illustrating a method of fabricating the micro LED display device according to the third exemplary embodiment of the present invention.

Figure 10A:
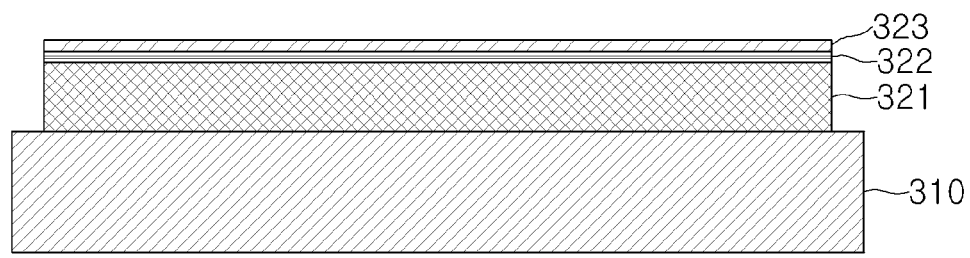

Referring to FIG. 10A, the emission structure 320 may be formed by sequentially growing a first conductive semiconductor layer 321, an active layer 322, and a second conductive semiconductor layer 323 on a growth substrate 310.

The growth substrate 310 may be formed of at least one of materials having transparency, for example, sapphire ($Al_2O_3$), a single crystal substrate, SiC, GaAs, GaN, ZnO, AlN, Si, GaP, InP, and Ge, but is not limited thereto.

The first conductive semiconductor layer 321 may be selected from semiconductor materials, for example, InAlGaN, GaN, AlGaN, AlInN, InGaN, AlN, and InN, having an empirical formula of $In_xAl_yGa_{1-x-y}N$ ($0 \leq x \leq 1$, $0 \leq y \leq 1$, $0 \leq x+y \leq 1$), and an n-type dopant, such as Si, Ge, and Sn, may be doped. The first conductive semiconductor layer 321 may be formed by injecting trimethyl gallium (TMGa) gas, ammonia ($NH_3$) gas, and xylene ($SiH_4$) gas to a chamber together with hydrogen gas.

The active layer 322 may be formed of a semiconductor material having an empirical formula of $In_xAl_yGa_{1-x-y}N$ ($0 \leq x \leq 1$, $0 \leq y \leq 1$, $0 \leq x+y \leq 1$). The active layer 322 may be formed by injecting trimethyl gallium (TMGa) gas, trimethyl indium (TMIn) gas, and ammonia ($NH_3$) gas to a chamber together with hydrogen gas.

The second conductive semiconductor layer 323 may be selected from semiconductor materials, for example, InAlGaN, GaN, AlGaN, InGaN, AlInN, AlN, InN, having an empirical formula of $In_xAl_yGa_{1-x-y}N$ ($0 \leq x \leq 1$, $0 \leq y \leq 1$, $0 \leq x+y \leq 1$), and a p-type dopant, such as Mg, Zn, Ca, Sr, and Ba, may be doped. The second conductive semiconductor layer 323 may be formed by injecting trimethyl gallium (TMGa) gas, ammonia ($NH_3$) gas, and biacetyl cyclopentadienyl magnesium ($EtCp_2Mg$){$Mg(C_2H_5C_5H_4)_2$} gas to a chamber together with hydrogen gas.

Figure 10B:
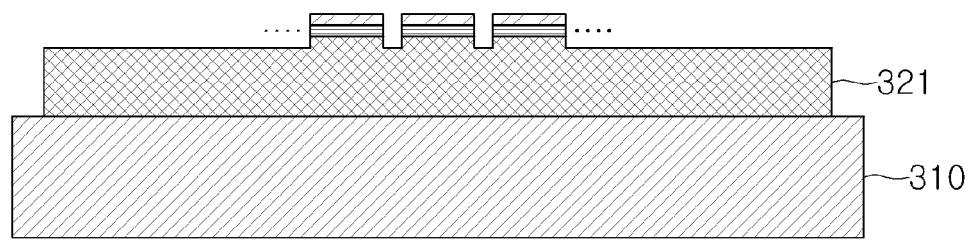

Referring to FIG. 10B, a plurality of LEDs (that is, the plurality of micro LED pixels) may be formed by performing isolation etching on the emission structure 320 according to a unit pixel region. For example, the isolation etching may be performed by a dry etching method, such as inductively coupled plasma (ICP). One upper surface of the first conductive semiconductor layer 321 is exposed through the isolation etching.

Figure 10C:
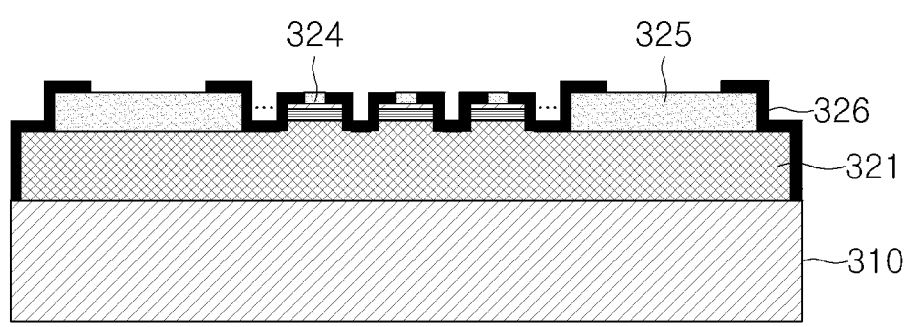

Referring to FIG. 10C, the second conductive metal layer 324 may be formed on one upper surface of the second conductive semiconductor layer 323, and the first conductive metal layer 325 may be formed on one upper surface of the mesa-etched first conductive semiconductor layer 321. In this case, the first and second conductive metal layers 324 and 325 may be formed by a deposition process or a plating process, but are not limited thereto. Then, a passivation layer 326 may be formed on the growth substrate 310, the compound semiconductor layers 321, 322, and 323, and the first and second conductive metal layer 325 and 324, and the passivation layer 326 may be selectively removed so that one upper surface of each of the first and second conductive metal layers 325 and 324 are exposed to the outside.

Figure 10D:
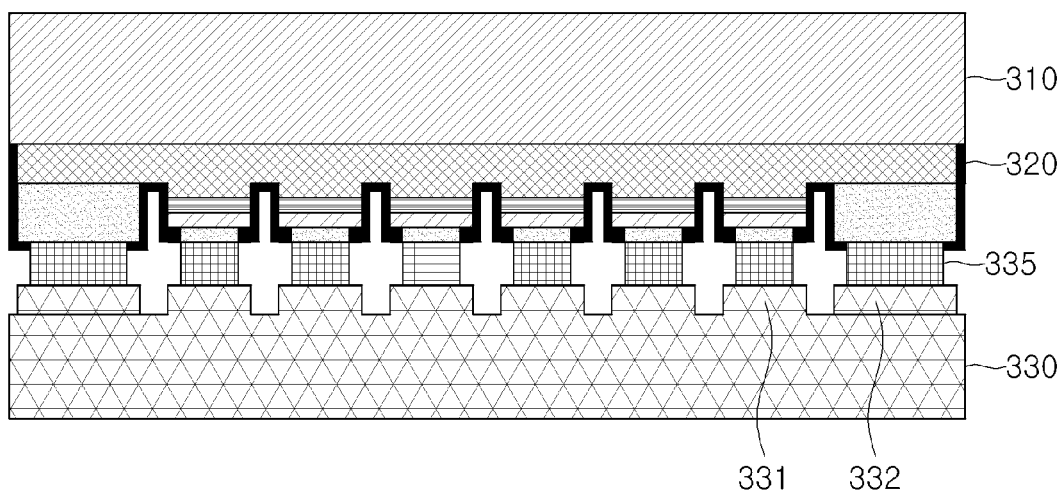

Referring to FIG. 10D, a plurality of bumps 335 is disposed on the CMOS cells 331 and the common cell 332 of the micro LED driving substrate 330. The first and second conductive metal layers 325 and 324 are made to head downwardly by inversing up and down the micro LED panel. The CMOS cells 331 are in contact with the micro LED pixels by making the micro LED driving substrate 330 in the state in which the plurality of bumps 335 is disposed face the micro LED panel and corresponding one-to-one the CMOS cells 331 and the micro LED pixels, and then the CMOS cells 331 and the micro LED pixels are heated. Then, the plurality of bumps 335 is melted, and as a result, the CMOS cells 331 and the corresponding micro LED pixels are electrically connected, and the common cell 332 of the micro LED driving substrate 330 and the common electrode 325 of the micro LED panel corresponding to the common cell 332 are electrically connected.

Figure 10E:
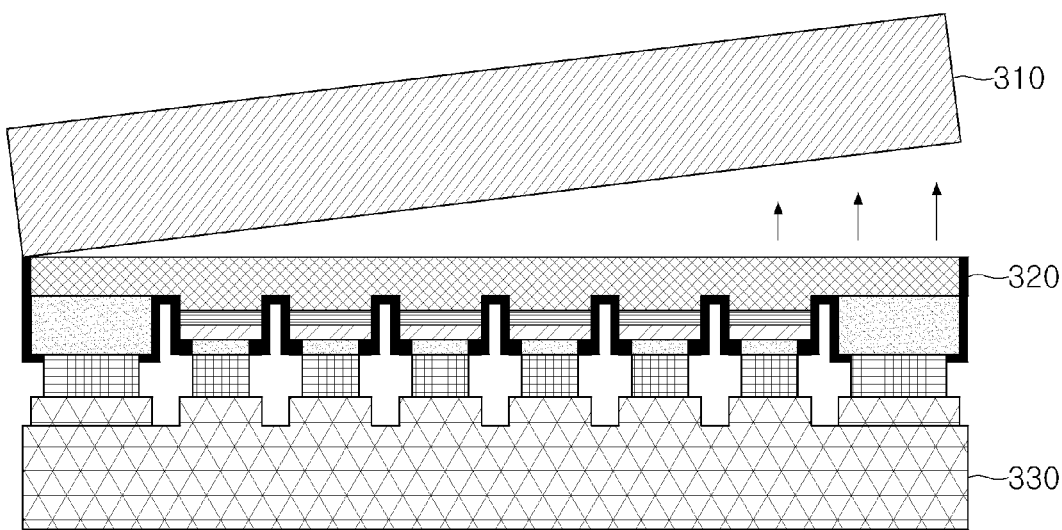

Referring to FIG. 10E, the growth substrate 310 attached to the emission structure 320 may be separated by a laser lift off (LLO) method, a chemical lift off (CLO) method, an electrical lift off (ELO), an etching method, or the like.

Referring to FIG. 10F, an upper surface of the emission structure 320 may be coated with a photo resist (PR) 340 by using a spin coating method. In the meantime, as another exemplary embodiment, bonding force between the emission structure 320 and the PR 340 may be improved by chemically processing (for example, hexamethyldisilazane processing) the surface of the emission structure 320 before the coating process. Further, a passivation layer (not illustrated) for protecting the emission structure 320 may be formed between the emission structure 320 and the PR 340 before the coating process. Then, mask patterns 380 may be precisely arranged on the PR 340 and then an exposure process of emitting ultraviolet rays and the like may be performed.

Figure 10G:
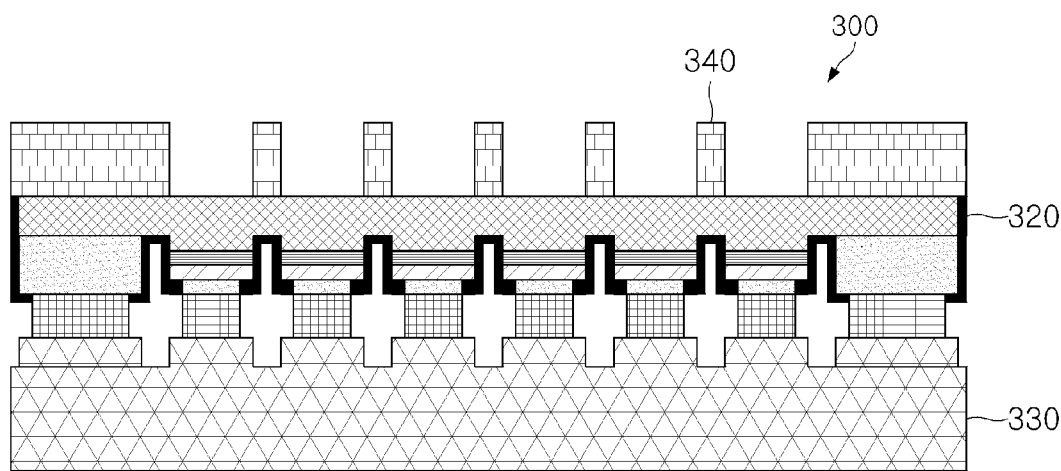

Referring to FIG. 10G, the plurality of separators 340 may be formed on the emission structure 320 by performing a developing process on the PR 340 which passes the exposure process. In this case, the plurality of separators 340 may be disposed on the emission structure 320 corresponding to the locations between the pixels (that is, the regions in which the active layer and the second conductive semiconductor layer are etched).

In the meantime, in the present exemplary embodiment, the case where the plurality of separators is formed through the PR is exemplified, but the present invention is not limited thereto. For example, as another exemplary embodiment, the plurality of separators may also be formed on the growth substrate by forming a material for forming the separator on the growth substrate, stacking the PR on the material, sequentially performing exposure and developing processes by using a mask pattern, and wet or dry etching a region exposed by the PR.

Figure 10H:
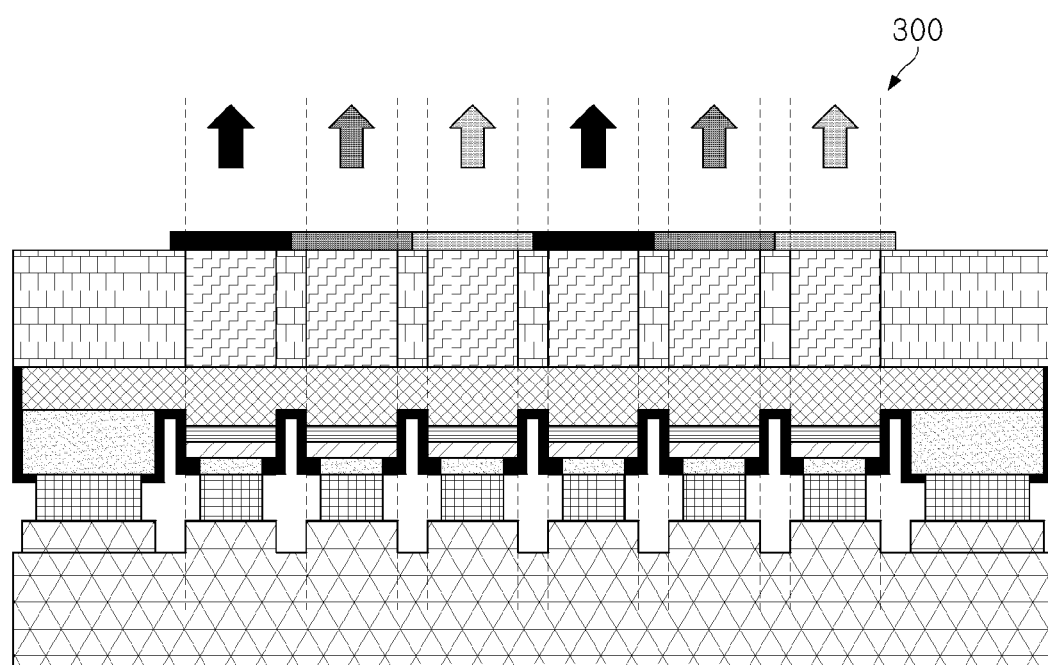

Referring to FIG. 10H, the fluorescent substance 350 may be injected between the separators 340 formed on the emission structure 320. Accordingly, the fluorescent substance 350 may change a wavelength of light emitted from the micro LED pixel to a wavelength of white light.

Then, the color filters 360, 370, and 380 may be formed (or attached) on the plurality of separators 340 and the fluorescent substance 350. Accordingly, the R filter 360 among the color filters may transmit only a wavelength of red light in white light emitted from the fluorescent substance 350, the G filter 370 may transmit only a wavelength of green light in white light emitted from the fluorescent substance 350, and the B filter 380 may transmit only a wavelength of blue light in white light emitted from the fluorescent substance 350.

The micro LED display device 300 formed through the foregoing processes may minimize light scattering due to the growth substrate and implement a full color of high resolution (an HD level).

In the meantime, in the foregoing, the particular exemplary embodiments of the present invention have been described, but may be variously modified without departing from the scope of the invention as a matter of course. Accordingly, the scope of the present invention is not limited to the exemplary embodiment, and should be defined in equivalents of the claims, as well as the claims to be described below.

What is claimed is:

1. A micro-LED display comprising:
   a micro-LED panel including an emission structure having a first surface formed of a plurality of micro-LED pixels arranged in rows and columns and a second surface formed of a plurality of separators having at least a first separator, a second separator, a third separator and a fourth separator;
   a micro-LED driving substrate including a plurality of CMOS cells for individually driving the plurality of micro-LED pixels; and
   a fluorescent substance having a first color changing material between the first separator and the second separator, a second color changing material between the second separator and the third separator and a third color changing material between the third separator and the fourth separator;
   wherein the plurality of micro LED pixels are formed by etching a first surface of the emission structure in predetermined etch portions, and the plurality of separators are formed in correspondence to the etch portions.

2. The micro-LED display of claim 1, wherein each of the separators is formed about the same height and a gap between the separators is formed to be about the same size as a size of the micro-LED pixel.

3. The micro-LED display of claim 1, wherein the plurality of micro LED pixels comprise at least a first micro-LED pixel, a second micro-LED pixel, and a third micro-LED pixel and the first color changing material, the second color changing material and the third color changing material forming the second surface in correspondence to the first micro-LED pixel, the second micro-LED pixel, and the third micro-LED pixel, respectively.

4. The micro-LED display of claim 1, wherein the plurality of separators are formed of a polymer compound or a ceramic material.

5. The micro-LED display of claim 1, wherein the first, second, and third color changing materials include quantum dots.

6. The micro-LED display of claim 1, wherein the first, second, and third color changing matarials have the same height as a height of the separator.

7. The micro-LED display of claim 1, wherein the plurality of separators are formed on an upper surface of the first conductive semiconductor layer in a direction corresponding to the second surface of the emission structure.

8. A micro-LED display comprising:
   a micro-LED panel including an emission structure having a first surface formed of a plurality of micro-LED pixels arranged in rows and of columns and a second surface formed of a plurality of separators having at least a first separator, a second separator, a third separator and a fourth separator;
   a micro-LED driving substrate including a plurality of CMOS cells for individually driving the plurality of micro-LED pixels;
   a fluorescent substance having a first color changing material between the first separator and the second separator, a second color changing material between the second separator and the third separator and a third color changing material between the third separator and the fourth separator; and
   a plurality of color filers having a red color filer covering the first color changing material, a green color filter covering the second color changing material and a blue color filter covering the third color changing material;
   wherein the first color changing material, the second changing material and the third changing material are formed of same material and change a wavelength of blue or UV light to a wavelength of white light.

9. The micro-LED display of claim 8, wherein the first, second, and third color changing materials have the same height as a height of the separator.

10. The micro-LED display of claim 8, wherein the plurality of micro LED pixels are formed by etching a first surface of the emission structure in predetermined etch portions, and the plurality of separators are formed in correspondence to the etch portions.

11. The micro-LED display of claim 8, wherein the first, second, and third color changing materials include quantum dots.

12. The micro-LED display of claim 8, wherein the plurality of separators are formed on an upper surface of the first conductive semiconductor layer in a direction corresponding to the second surface of the emission structure.

13. The micro-LED display of claim 8, wherein the plurality of separators are formed of a polymer compound or a ceramic material.

14. A micro-LED display comprising:
   a micro-LED panel including an emission structure having a first surface formed of a plurality of micro-LED pixels arranged in rows and of columns and a second surface formed of a plurality of separators having at least a first separator, a second separator, a third separator and a fourth separator;

a micro-LED driving substrate including a plurality of CMOS cells for individually driving the plurality of micro-LED pixels;

a fluorescent substance mixed a red color changing material, a green color changing material and a blue color changing material and formed between the first separator and the second separator, between the second separator and the third separator and between the third separator and the fourth separator; and a plurality of color filers having a red color filer covering the fluorescent substance between the first separator and the second separator, a green color filer covering the fluorescent substance of between the second separator and the third separator and a blue color filter covering the fluorescent substance of between the third separator and the fourth separator;

wherein the plurality of micro LED pixels are formed by etching a first surface of the emission structure in predetermined etch portions, and the plurality of separators are formed in correspondence to the etch portions.

15. The micro-LED display of claim 14 wherein the first, second, and third color changing materials include quantum dots.

16. The micro-LED display of claim 14, wherein the first, second, and third color changing materials have the same height as a height of the separator.

17. The micro-LED display of claim 14, wherein the plurality of separators are formed on an upper surface of the first conductive semiconductor layer in a direction corresponding to the second surface of the emission structure.

18. The micro-LED display of claim 14, wherein the plurality of separators are formed of a polymer compound or a ceramic material.

* * * * *

UNITED STATES PATENT AND TRADEMARK OFFICE
CERTIFICATE OF CORRECTION

PATENT NO. : 10,902,771 B2
APPLICATION NO. : 16/822612
DATED : January 26, 2021
INVENTOR(S) : Eun Sung Shin et al.

Page 1 of 1

It is certified that error appears in the above-identified patent and that said Letters Patent is hereby corrected as shown below:

In the Claims

Column 18, Line 25, "of columns" should have been "columns."

Signed and Sealed this
Second Day of March, 2021

Drew Hirshfeld
*Performing the Functions and Duties of the
Under Secretary of Commerce for Intellectual Property and
Director of the United States Patent and Trademark Office*